US 7,975,786 B2

(12) United States Patent
Ishii et al.

(10) Patent No.: US 7,975,786 B2
(45) Date of Patent: Jul. 12, 2011

(54) ELECTRIC GROUND WORKING VEHICLE

(75) Inventors: Norihiro Ishii, Hyogo (JP); Kengo Sasahara, Hyogo (JP); Tomoyuki Ebihara, Hyogo (JP); Kazunari Koga, Hyogo (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 151 days.

(21) Appl. No.: 12/426,051

(22) Filed: Apr. 17, 2009

(65) Prior Publication Data
US 2009/0260901 A1    Oct. 22, 2009

(30) Foreign Application Priority Data

Apr. 18, 2008 (JP) .................................. 2008-109360

(51) Int. Cl.
*A01D 34/03* (2006.01)
(52) U.S. Cl. ......... 180/6.5; 180/6.2; 180/6.48; 180/6.24
(58) Field of Classification Search ............... 180/6.5, 180/6.2, 6.48, 6.24
See application file for complete search history.

(56) References Cited

U.S. PATENT DOCUMENTS

| | | | | |
|---|---|---|---|---|
| 6,092,617 A * | 7/2000 | White et al. | .................. | 180/338 |
| 6,196,342 B1 * | 3/2001 | Teal et al. | ...................... | 180/6.2 |
| 6,257,357 B1 * | 7/2001 | Teal et al. | ...................... | 180/6.2 |
| 6,301,864 B1 * | 10/2001 | Damie et al. | ................... | 56/11.3 |
| 6,434,919 B2 * | 8/2002 | Schick | ........................... | 56/15.9 |
| 6,688,090 B2 * | 2/2004 | Velke et al. | ................... | 56/14.7 |
| 6,725,954 B1 * | 4/2004 | Keane et al. | ................ | 180/6.48 |
| 6,729,115 B2 * | 5/2004 | Bartel | .......................... | 56/11.3 |
| 6,904,985 B2 * | 6/2005 | Ferree et al. | ................. | 180/6.32 |
| 6,912,831 B2 * | 7/2005 | Velke et al. | ..................... | 56/10.9 |
| 7,017,327 B2 * | 3/2006 | Hunt et al. | ..................... | 56/14.7 |
| 7,237,629 B1 * | 7/2007 | Bland et al. | ................. | 180/6.24 |
| 7,583,036 B2 * | 9/2009 | Kikuchi et al. | ................... | 318/5 |

(Continued)

FOREIGN PATENT DOCUMENTS

DE    102007027537 A1    1/2008

(Continued)

OTHER PUBLICATIONS

European Search Report for Application No./Patent No. 09005314.1-1264/2110295 dated Mar. 12, 2010.

(Continued)

*Primary Examiner* — Joanne Silbermann
*Assistant Examiner* — Michael R Stabley
(74) *Attorney, Agent, or Firm* — Cantor Colburn LLP

(57) ABSTRACT

There is provided an electric ground working vehicle including a left wheel and a right wheel, at least one caster, a working apparatus, an acceleration operating element for performing acceleration instructions, a turn operating element for performing turn instructions, and a control unit. The left wheel and the right wheel are independently driven by left and right electric motors respectively. The control unit controls a regenerative brake driving unit so that electric power is regenerated from the left and right electric motors to an electric power source unit when the acceleration operating element is not operated during traveling to regeneratively brake the left and right wheels. The control unit controls the brake force of the wheels so that the brake force of the wheel at the inside of a turn, among the left wheel and the right wheel, can be made greater than the brake force of the wheel at the outside of a turn when the acceleration operating element is not operated during traveling and turn instructions are inputted from the turn operating element.

10 Claims, 13 Drawing Sheets

FIG. 1

U.S. PATENT DOCUMENTS

2005/0023049 A1* 2/2005 Ferree et al. .................... 180/6.3
2009/0000839 A1* 1/2009 Ishii et al. ..................... 180/65.5

FOREIGN PATENT DOCUMENTS

| EP | 1541446 A2 | 6/2005 |
|---|---|---|
| JP | 5-122805 A | 5/1993 |
| JP | 10-164708 A | 6/1998 |
| JP | 2006-507789 A | 3/2006 |
| WO | 2004/057166 A2 | 7/2004 |

OTHER PUBLICATIONS

European Patent Office Communication pursuant to Article 94(3) EPC dated Dec. 12, 2010.

* cited by examiner

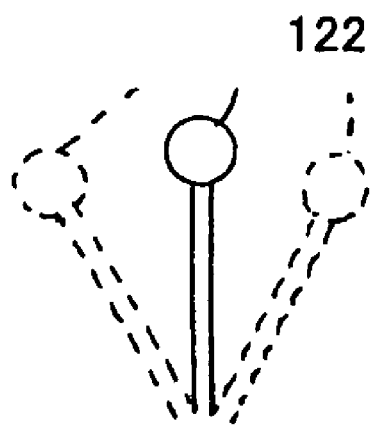
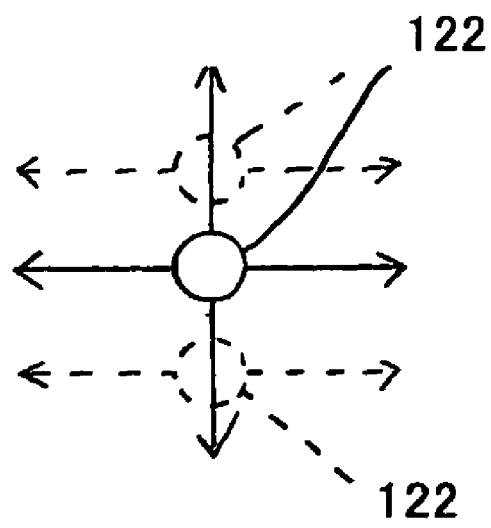
FIG. 14A  FIG. 14B
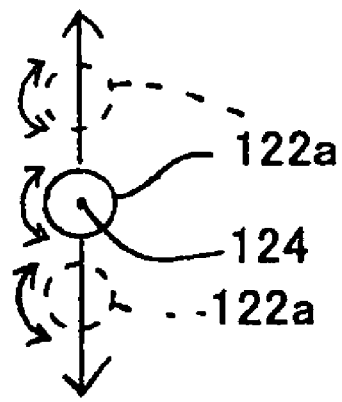
FIG. 15

US 7,975,786 B2

ELECTRIC GROUND WORKING VEHICLE

PRIORITY INFORMATION

Japanese Patent Application No. 2008-109360 filed on Apr. 18, 2008 is specified and incorporated herein by reference.

BACKGROUND

1. Technical Field

The present invention generally relates to an electric ground working vehicle including left and right wheels independently driven by left and right electric motors respectively, caster wheels being steering control wheels capable of being freely steered, and a working apparatus driven for ground working.

2. Related Art

Hitherto, there has been known a ground working vehicle equipped with a working apparatus driven for ground working such as lawn mowing and cultivation. In such a ground working vehicle, there has been studied an electric ground working vehicle including left and right wheels being main driving wheels independently driven by electric motors respectively, and caster wheels being steering control wheels capable of being freely steered.

For example, as a working vehicle, there is a self-traveling lawnmower vehicle which is provided with a lawnmower being a working apparatus, and which a worker boards to drive and operate the lawnmower. This is referred to as a riding lawnmower vehicle. As a lawnmower, there is known a lawn mowing rotating tool, for example.

The riding lawnmower vehicle is a kind of vehicle, but it is used for traveling not on a road, but on so-called off-road surfaces such as a garden. The riding lawnmower vehicle travels on the ground for the purpose of lawn mowing and includes a power source for driving wheels and a lawnmower. Among riding lawnmower vehicles, one which uses an electric motor as a power source for driving wheels is called a riding electric lawnmower vehicle. The electric motor is supplied with electric power by an electric power supplying source such as a battery. There is being studied a hybrid riding lawnmower vehicle in which a generator producing electricity using an internal combustion engine is mounted, and generated electric power is supplied to a battery.

Japanese Publication of International Patent Application No. 2006-507789, for example, discloses a hybrid power plant fitted with an integral engine and generator unit in which the engine shaft of an internal combustion engine is coupled to a rotor. The application also describes that in the lawnmower exemplified as a power plant, independent electric motors are coupled to a plurality of driving wheels to enable respective driving wheels to be independently controlled at variable speed, thereby allowing smooth starting, stopping, changing speed, changing direction, and turning of the lawnmower. As an example of turning by changing the independent speed of the driving wheels, there are cited examples in the above where electric motors are coupled to left and right rear wheels respectively.

U.S. Pat. No. 7,017,327B2 discloses a lawnmower having a configuration in which a deck motor for driving a lawn mowing blade, a left and right wheel motor for driving the independently controlled left and the right rear wheels, and a steering motor for steering the left and the right front wheels within a range of approximately 180 degrees around wheel axes by an electric power of an alternator connected to an engine, are arranged in the front of the lawnmower. In order to turn the lawnmower, a difference in speed between the left and the right rear wheels is calculated from the input of a steering control unit to control the wheel motor, and a steering signal is applied to the steering motor to control the position of the left and the right front wheels. Thereby, according to U.S. Pat. No. 7,017,327B2, the lawnmower can be turned without the left and the right rear wheels being steered.

As prior arts related to the present invention, there are known Japanese Patent Laid-Open Publication Nos. Hei5-122805 and Hei10-164708, as well as Japanese Publication of International Patent Application No. 2006-507789 and U.S. Pat. No. 7,0173,27B2.

As a method of turning a riding electric lawnmower vehicle, Japanese Publication of International Patent Application No. 2006-507789 discloses that the rotating speed of the left rear wheel is made different from that of the right rear wheel by electric motors independently provided on the left and the right rear wheels respectively. In U.S. Pat. No. 7,0173,27B2, steering is performed by causing the left and the right wheel motor to provide difference in speed to the left and the right rear wheel and the steering motor to control the position of the left and the right front wheel.

As a conventional riding electric lawnmower vehicle, there has been studied a riding electric lawnmower vehicle which includes left and right wheels being main driving wheels independently driven by electric motors, and caster wheels being steering control wheels capable of being freely steered, and the vehicle is instructed to turn using a steering wheel being a turn operating element, and to accelerate using a acceleration pedal being an acceleration operating element. In such a riding electric lawnmower vehicle, when a driver instructs the vehicle to turn through a turn operating element, a controller receiving a signal corresponding to the instruction causes electric motors corresponding to the left and the right wheels to generate a difference in rotating speed, rotating the left and the right wheels at different speeds, thereby turning the vehicle.

For such a riding electric lawnmower vehicle, a turning direction is instructed by operating a steering wheel, and a speed is instructed by operating an acceleration pedal. For this reason, when the vehicle is freewheeling or the vehicle is braked, that is, the acceleration pedal is not operated with a foot kept off the pedal when traveling, the electric motors are also stopped. Therefore, even if the driver instructs the vehicle to turn through the steering wheel while the vehicle is freewheeling, the riding electric lawnmower vehicle cannot cause the left and the right wheels to generate a difference in rotating speed, so that it is difficult for the vehicle to turn in the direction which the driver wants.

On the other hand, when the riding electric lawnmower vehicle is traveling on a slope with the vehicle rolling, that is, while the vehicle is rolling and tilts to one side, to the left or the right, with an axis which extends in the front to rear direction of the vehicle and passes the center of gravity, gravity acts so that the vehicle slants to one side, namely to the left or the right thereof, so that even if the driver instructs the vehicle to move in a straight line using the steering wheel when freewheeling, the vehicle turns downward, which makes it difficult to cause the vehicle to travel in the direction which the driver wants. Needless to say, even when the driver instructs the vehicle to turn using the steering wheel, it is difficult to turn the vehicle in the direction which the driver wants. Thus, improvement is required in the difficulty in turning the vehicle in the desired direction when freewheeling from the viewpoint of safe traveling of the vehicle. In addition, there needs to be improvement to the disadvantage that the vehicle continues traveling in the undesired direction without stopping when freewheeling, from the viewpoint of safe traveling of the vehicle. Means of solving such disadvantages are not disclosed in any of Japanese Publication of International Patent Application No. 2006-507789, U.S. Pat. No. 7,0173,27B2 and Japanese Patent Laid-Open Publication Nos. Hei 5-122805 and Hei 10-164708. Furthermore, such disadvantages may occur not only in the riding electric lawnmower vehicle described above, but also in an electric ground working vehicle with other working apparatus.

SUMMARY

It is an advantage of the present invention to make it possible to more effectively perform safe traveling of a vehicle even while an acceleration operating element is not operated during traveling, for example, while the vehicle is freewheeling, in a configuration in which a left wheel and a right wheel are independently driven by left and right electric motors, respectively, and an electric ground working vehicle can be turned by a difference in rotating speed of the left and right electric motors, for example.

An electric ground working vehicle according to the present invention includes: a left wheel and a right wheel, being main driving wheels, which are independently driven by left and right electric motors respectively; at least one caster, being a steering control wheel, which is freely steerable; a working apparatus driven for ground working; an acceleration operating element for performing acceleration instructions; a turn operating element for performing turn instructions; and a control unit; wherein the control unit controls force applied to the wheels, being the brake force or driving force of the wheels so that the rotating speed of a wheel at the inside of a turn, of the left and the right wheels, can be lower than the rotating speed of the wheel at the outside of a turn when the acceleration operating element is not operated during traveling, and turn instructions are inputted from the turn operating element.

According to the above electric ground working vehicle, since the control unit controls force applied to the wheel, being the brake force or driving force of the wheel, so that the rotating speed of the wheel at the inside of a turn, of the left and the right wheel, can be made lower than the rotating speed of the wheel at the outside of a turn, when the acceleration operating element is not operated during travel and turn instructions are inputted from the turn operating element, the rotating speed of the wheel at the inside of a turn becomes lower than the rotating speed of the wheel at the outside of a turn when the acceleration operating element is not operated during travel. For this reason, the vehicle can be turned even when the acceleration operating element is not operated during travel, which enables more effective performing of safe traveling of a vehicle.

The electric ground working vehicle according to the present invention includes: a left and a right wheel, being main driving wheels, which are independently driven by a left and a right electric motor respectively; at least one caster, being a steering control wheel which is freely steerable; a working apparatus driven for ground working; an acceleration operating element for performing acceleration instructions; a turn operating element for performing turn instructions; and a control unit for controlling a regenerative brake driving unit so that electric power is regenerated from the left and the right electric motor to an electric power source unit when the acceleration operating element is not operated during travel to regeneratively brake the left and the right wheel; wherein the control unit controls the brake force of the wheel so that the brake force of the wheel at the inside of a turn, among the left and the right wheels, can be greater than the brake force of the wheel at the outside of a turn when the acceleration operating element is not operated during traveling and turn instructions are inputted from the turn operating element.

According to the above electric ground working vehicle, since the control unit controls the brake force of the wheel so that the brake force of the wheel at the inside of a turn, among the left and the right wheel, can be greater than the brake force of the wheel at the outside of a turn when the acceleration operating element is not operated during traveling and turn instructions are inputted from the turn operating element, the rotating speed of the wheel at the inside of a turn becomes lower than the rotating speed of the wheel at the outside of a turn when the acceleration operating element is not operated during traveling. For this reason, the vehicle can be turned even when the acceleration operating element is not operated during traveling, which enables more effective performing of safe traveling of a vehicle.

In the electric ground working vehicle according to the present invention, preferably, the control unit controls the regenerative brake driving unit corresponding to at least one of the left and the right electric motors so that a turn-inside regenerative brake force obtained from the electric motor corresponding to the wheel at the inside of a turn, among the left and the right wheels, can be greater than a turn-outside regenerative brake force obtained from the electric motor corresponding to the wheel at the outside of a turn when the acceleration operating element is not operated during traveling and turn instructions are inputted from the turn operating element.

The electric ground working vehicle according to the present invention preferably further includes: left and right friction brake units which are provided in correspondence with the left and the right wheels and whose brake forces can be independently controlled; wherein the control unit controls the friction brake units so that a turn-inside friction brake force obtained from the friction brake unit corresponding to the wheel at the inside of a turn, among the left and the right wheels, can be greater than a turn-outside friction brake force obtained from the friction brake unit corresponding to the wheel at the outside of a turn when the acceleration operating element is not operated during traveling and turn instructions are inputted from the turn operating element.

In the electric ground working vehicle according to the present invention, preferably, the control unit controls the brake force of the wheel so that the sum of the brake forces of the left and the right wheels obtained when the acceleration operating element is not operated during traveling and turn instructions are inputted from the turn operating element can be greater than a moving-straight regenerative brake force obtained from the left and the right electric motors when the acceleration operating element is not operated during traveling and moving-straight instructions are inputted from the turn operating element.

According to the above configuration, the brake force can be prevented from becoming lower than the brake force at the time of a moving-straight when the acceleration operating element is not operated during traveling and turn instructions are inputted from the turn operating element, which enables more effective safe traveling of a vehicle.

The electric ground working vehicle according to the present invention preferably further includes: an initial brake force setting operation unit for discretionally setting the same initial brake forces in the left and the right wheels, including the regenerative brake forces obtained from the left and the right electric motors when the acceleration operating element is not operated during traveling straight.

In the electric ground working vehicle according to the present invention, preferably, if a target brake force of at least one the left and the right wheels, calculated from an initial brake force setting value calculated in response to a signal from the initial brake force setting operation unit and the steering direction and the steering amount of the turn operating element, is greater than the maximum regenerative brake force that can be generated on at least one of the left and the right wheels according to the chargeable leeway of the electric power source unit, the left and the right friction brake units provided in correspondence with the left and the right wheels are controlled so that a shortage uncompensated by the maximum regenerative brake force of the target brake force can be compensated by the friction brake force.

In the electric ground working vehicle according to the present invention, preferably, if a target brake force of at least one the left and the right wheels, calculated from an initial brake force setting value calculated in response to a signal from the initial brake force setting operation unit and the steering direction and the steering amount of the turn operating element, is greater than the maximum regenerative brake force that can be generated on at least one of the left and the right wheels according to the chargeable leeway of the electric power source unit, a driver circuit, being the regenerative brake driving unit, is controlled so that at least one of the left and the right electric motors can generate a reverse torque to cause the electric power source unit to supply a driving electric power to at least one of the left and the right electric motors, thereby generating the target brake force on the left and the right wheels.

The electric ground working vehicle according to the present invention, preferably further including: roll angle detecting unit for detecting a roll angle of the vehicle and inputting the detected signal to the control unit; wherein the control unit includes the roll angle correcting unit for correcting the brake forces of the left and the right wheels according to the roll angle so that the vehicle can be turned in the direction corresponding to the direction steered by the turn operating element when the acceleration operating element is not operated during traveling and the roll angle represented by a signal from the roll angle detecting unit is not zero.

According to the above configuration, the driver can easily drive the vehicle in the direction the driver wants to advance while the vehicle is traveling on a slope, while rolling, and even while the acceleration operating element is not operated, thereby enabling more effective performing of safe traveling of the vehicle.

In the electric ground working vehicle according to the present invention, preferably, the acceleration operating element is an acceleration pedal and the turn operating element is a steering wheel.

In the electric ground working vehicle according to the present invention, preferably, the acceleration operating element and the turn operating element are formed by a single common operating element and the common operating element is moved in other directions, or pushed forward or backward and rotated around an axis, to enable separate function as an acceleration operating element and a turn operating element.

The electric ground working vehicle according to the present invention preferably further includes: detecting unit for detecting the rotating speeds of the left and the right wheels; wherein the control unit is capable of controlling the rotating speeds and the brake forces of the left and the right wheels and controls the wheel at the outside of a turn, among the left and the right wheels so that the brake force becomes zero or constant, and controls the wheels so that the inside wheel rotating speed of the wheel at the inside of a turn, among the left and the right wheels, can be made lower than the outside wheel rotating speed calculated from the outside wheel rotating speed of the wheel at the outside of a turn detected by the detecting unit and the turn instruction value from the turn operating element when the acceleration operating element is not operated during traveling and turn instructions are inputted from the turn operating element.

According to the above configuration, it is made possible to turn the vehicle when the acceleration operating element is not operated during traveling and turn instructions are inputted from the turn operating element.

The electric ground working vehicle according to the present invention preferably further includes: detecting unit for detecting the rotating speeds of the left and the right wheels; wherein the control unit is capable of controlling the rotating speeds and the brake forces of the left and the right wheels and controls the wheel at the inside of a turn, among the left and the right wheels, so that the brake force becomes zero or constant, and controls the wheel so that the outside wheel rotating speed of the wheel at the outside of a turn, among the left and the right wheels, can be higher than the inside wheel rotating speed calculated from the inside wheel rotating speed of the wheel at the inside of a turn detected by the detecting unit and the turn instruction value from the turn operating element when the acceleration operating element is not operated during traveling and turn instructions are inputted from the turn operating element.

According to the above configuration, it is made possible to turn the vehicle when the acceleration operating element is not operated during traveling and turn instructions are inputted from the turn operating element. In this case, although the speed when turning may become higher than the speed in a moving straight, in that case, travel distance when an acceleration operating element is not operated during traveling, for example, while the vehicle is freewheeling, can be increased.

Thus, according to the electric ground working vehicle according to the present invention, it is made possible to more effectively perform safe traveling of a vehicle even while an acceleration operating element is not operated during traveling, for example, while the vehicle is freewheeling, in a configuration in which a left and a right wheel are independently driven by a left and a right electric motor respectively, and an electric ground working vehicle can be turned by a difference in rotating speed of the left and the right electric motors, for example.

BRIEF DESCRIPTION OF THE DRAWINGS

FIG. 14A is a schematic diagram illustrating a joystick of a first example;

FIG. 14B is a top view of the joystick in FIG. 14A; and

FIG. 15 is a schematic diagram illustrating a joystick of a second example.

DESCRIPTION OF EXEMPLARY EMBODIMENTS

First Embodiment of the Invention

Figure 1:
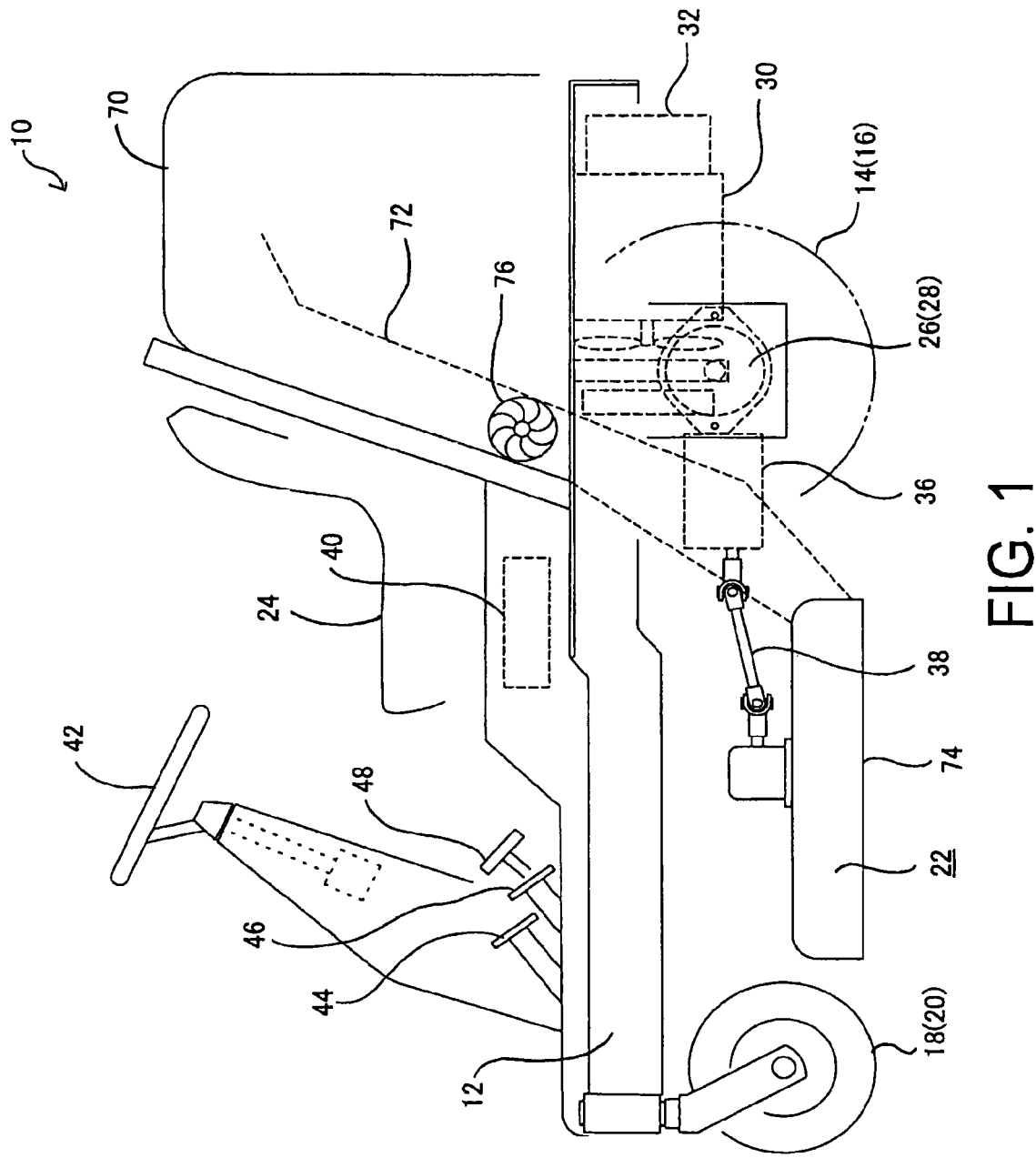
FIG. 1 is a schematic diagram illustrating a configuration of a lawnmower vehicle, being an electric ground working vehicle according to a first embodiment of the present embodiment.
Figure 2:
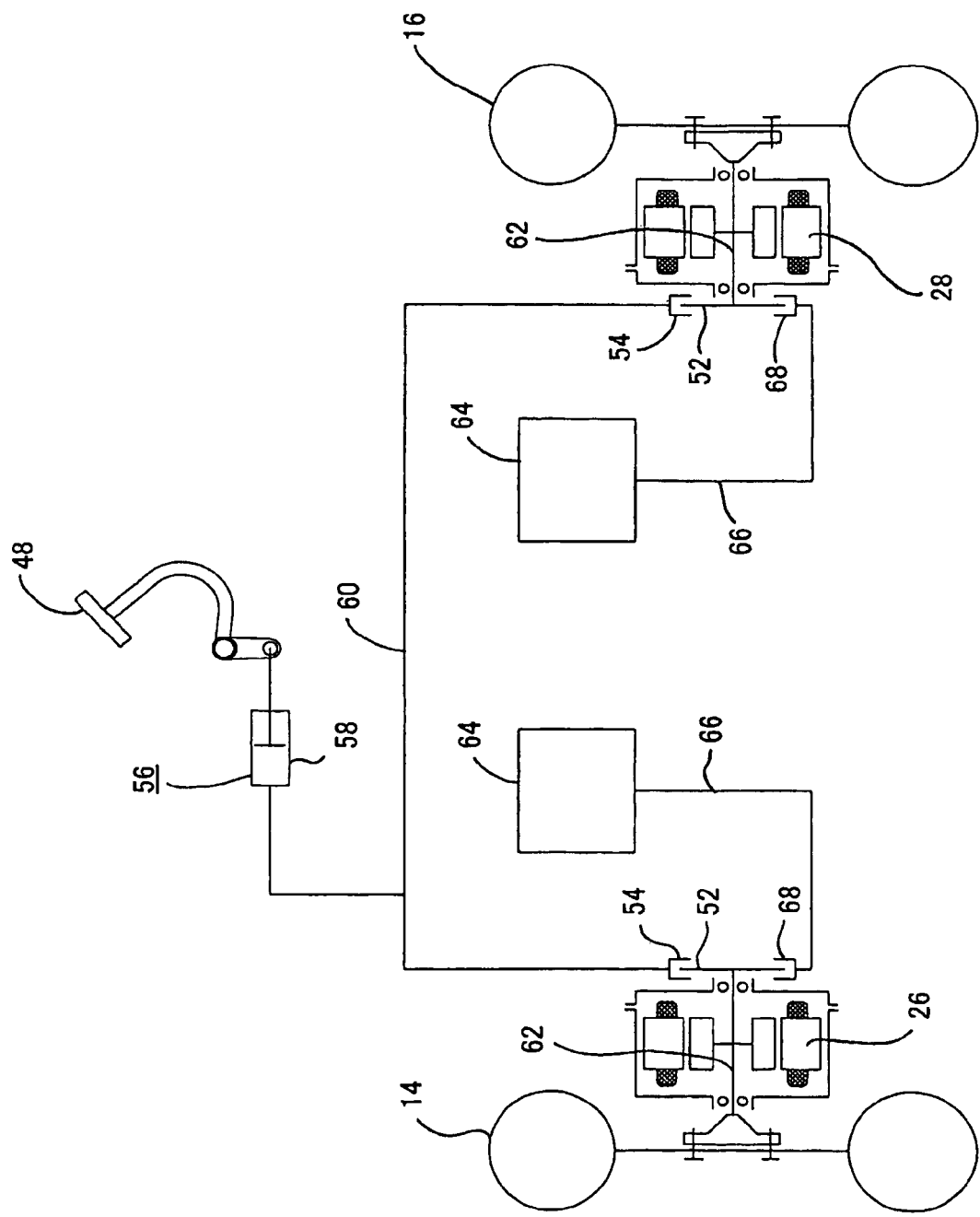
FIG. 2 is a schematic diagram illustrated one example of a configuration in which a brake controller capable of adjusting left and right braking forces is provided on a service brake in the first embodiment.
Figure 3:
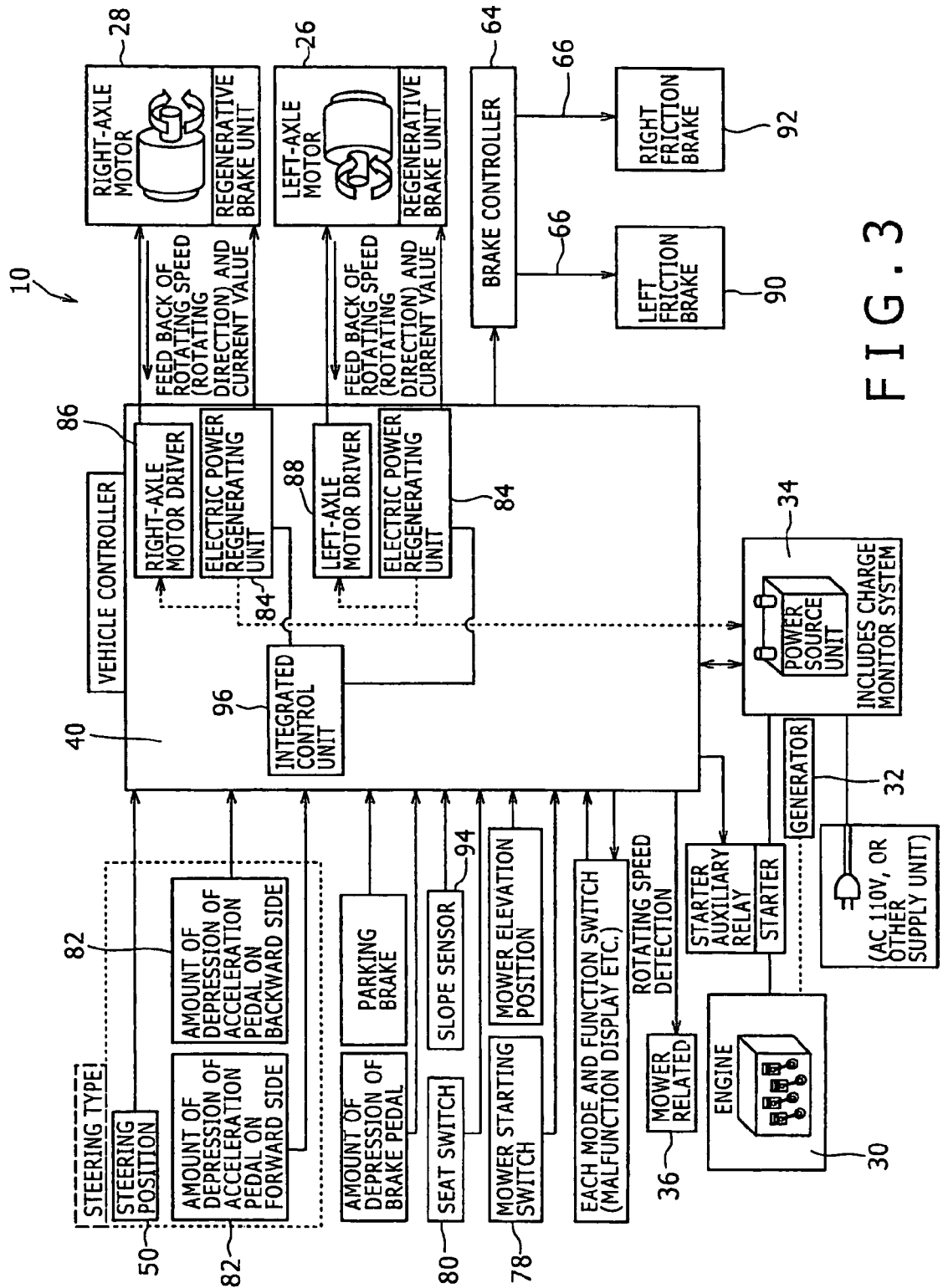
FIG. 3 is a block diagram illustrating a basic configuration of components for an electrical system including a controller in the lawnmower vehicle according to the first embodiment.
Figure 4:
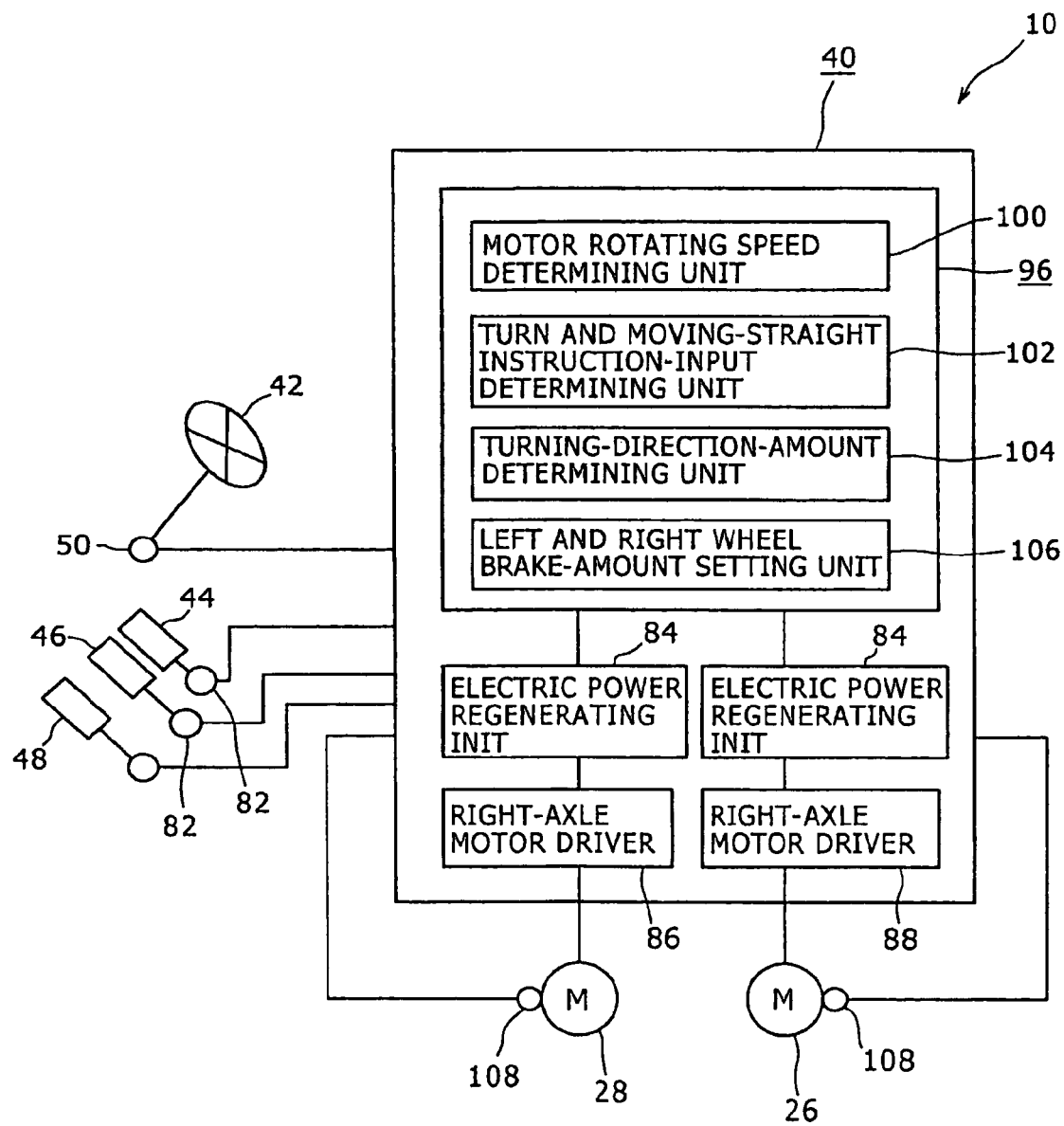
FIG. 4 is a block diagram illustrating the controller in FIG. 3 in detail.
Figure 5:
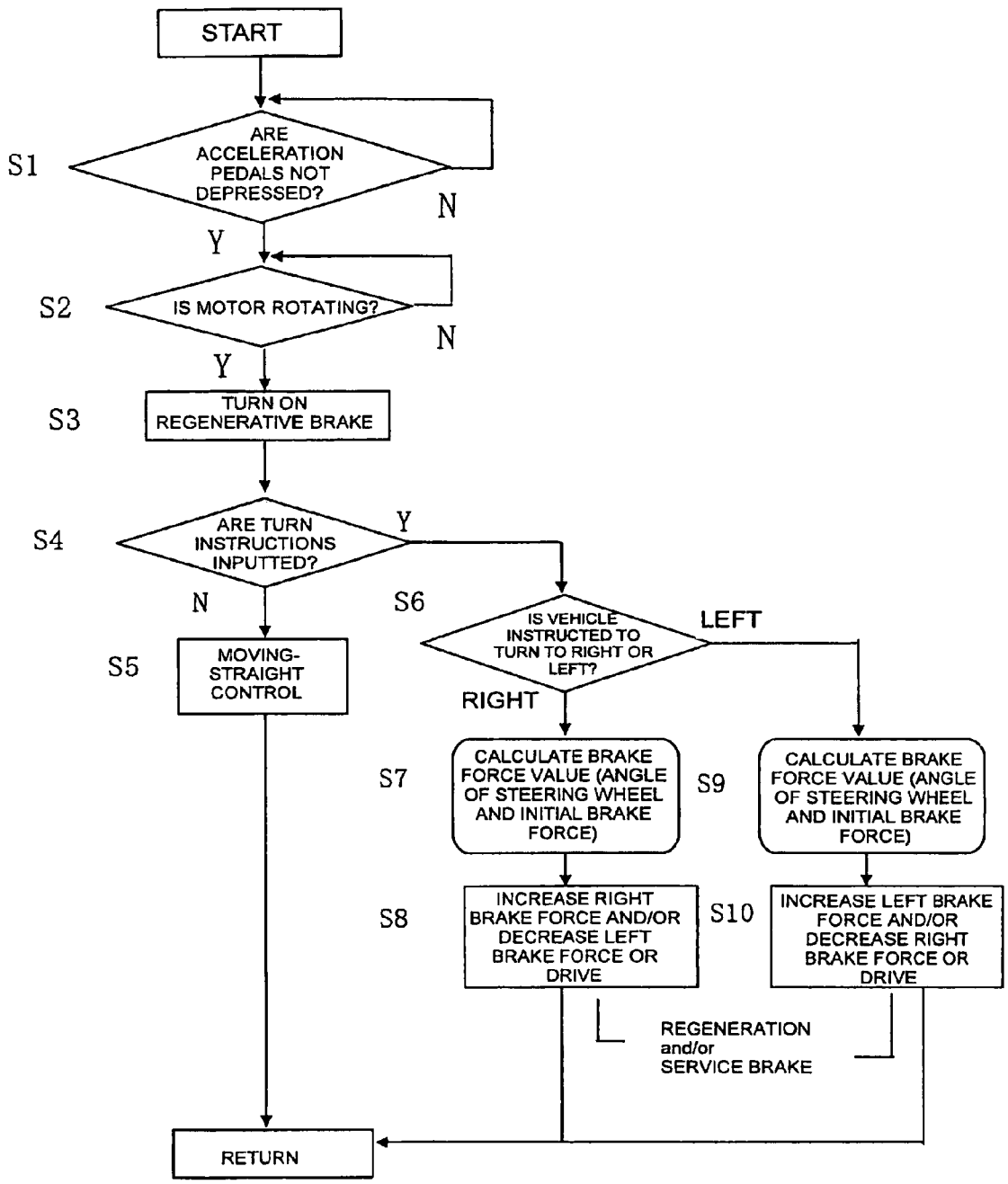
FIG. 5 is a flow chart illustrating steps for freewheeling brake control in the first embodiment.
Figure 6:
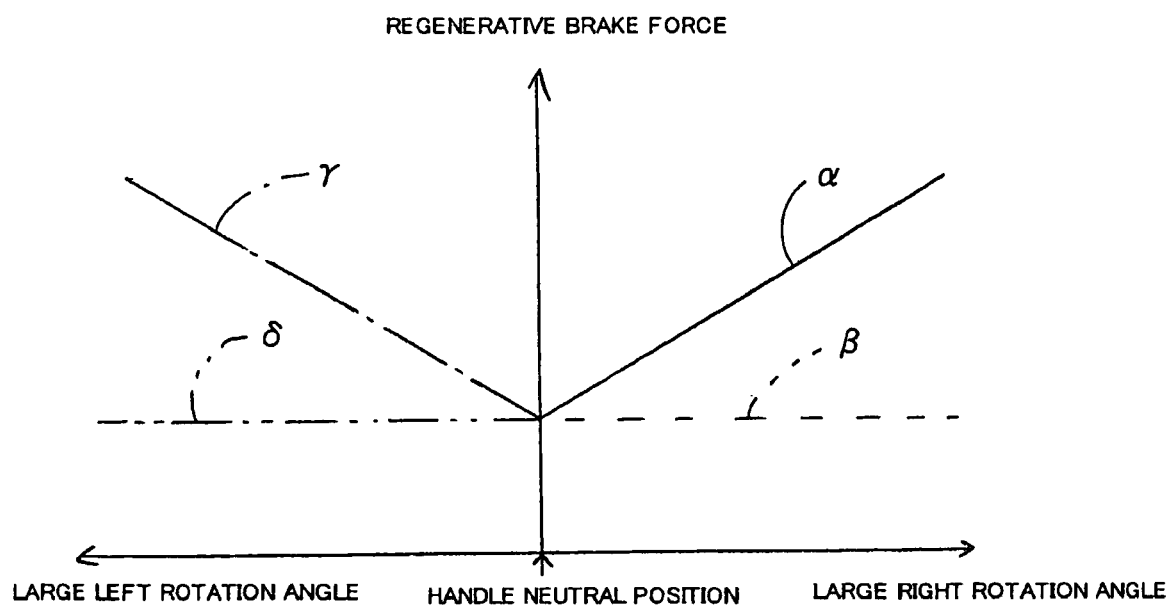
FIG. 6 is a chart illustrating a relationship between a rotation angle of a steering operating element and regenerative brake force generated by the left and the right electric motors in the freewheeling brake control.
Figure 7A:
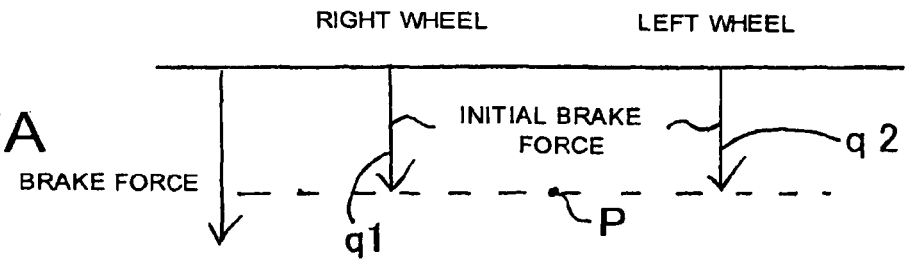
FIG. 7A is a chart illustrating a regenerative brake force for the wheels at the inside of a turn and at the outside of a turn, in the freewheeling brake control with an initial brake at the time of a moving straight.
Figure 7B:
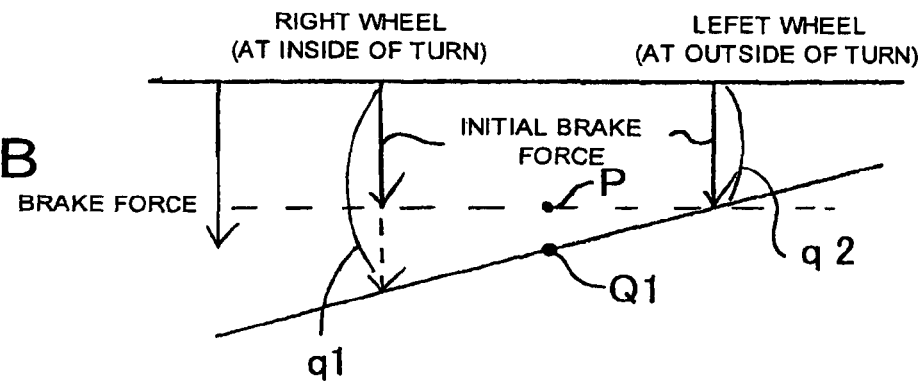
FIG. 7B is a chart illustrating the regenerative brake force for the wheels at the inside of a turn and at the outside of a turn in the freewheeling brake control with a first example of turn control.
Figure 7C:
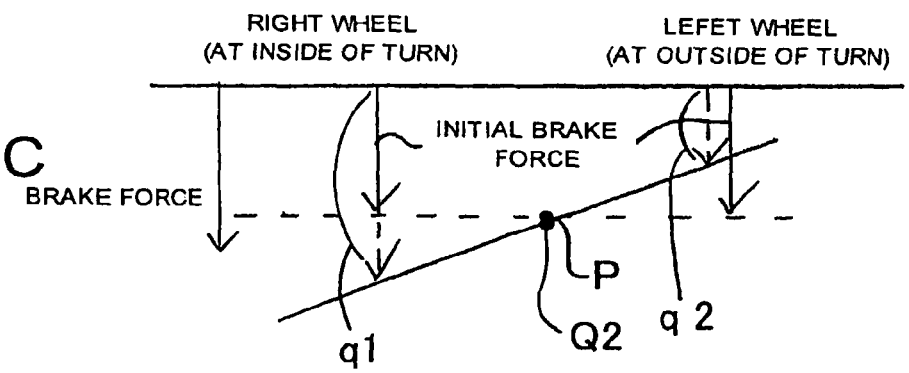
FIG. 7C is a chart illustrating the regenerative brake force for the wheels at the inside of a turn and at the outside of a turn in the freewheeling brake control with a second example of turn control.
Figure 8:
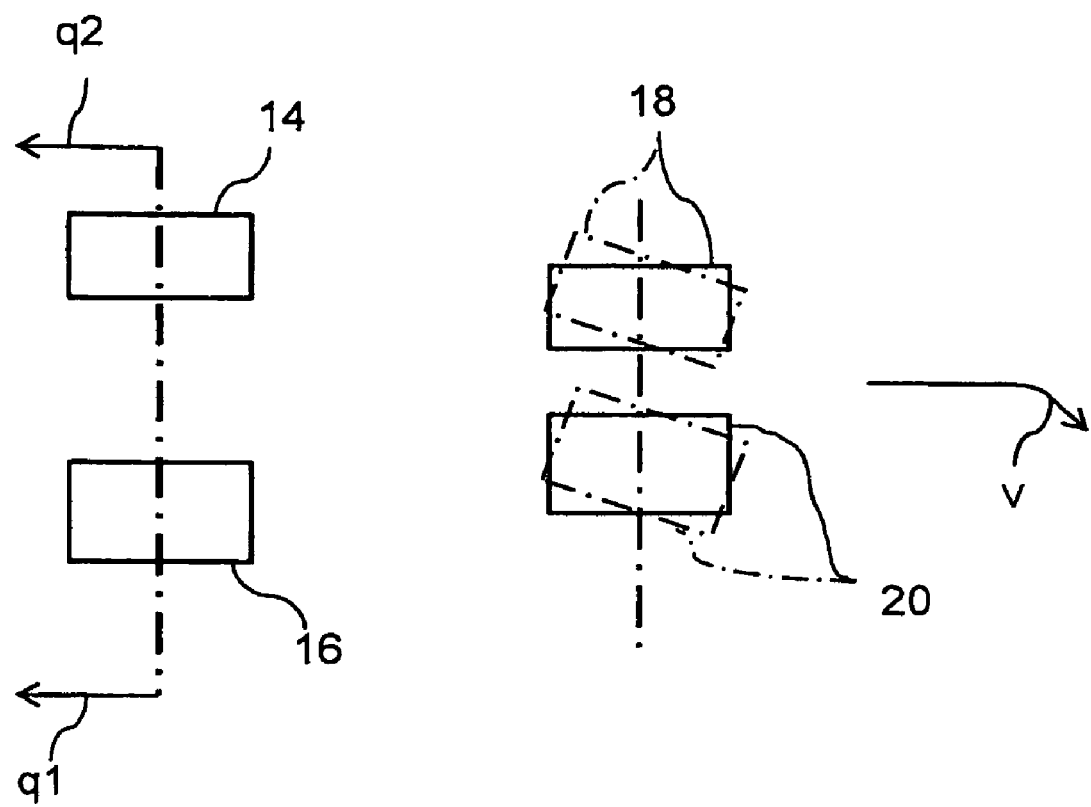
FIG. 8 is a top view of the left and the right wheels and the caster wheels for describing the turn control when freewheeling.
Figure 9:
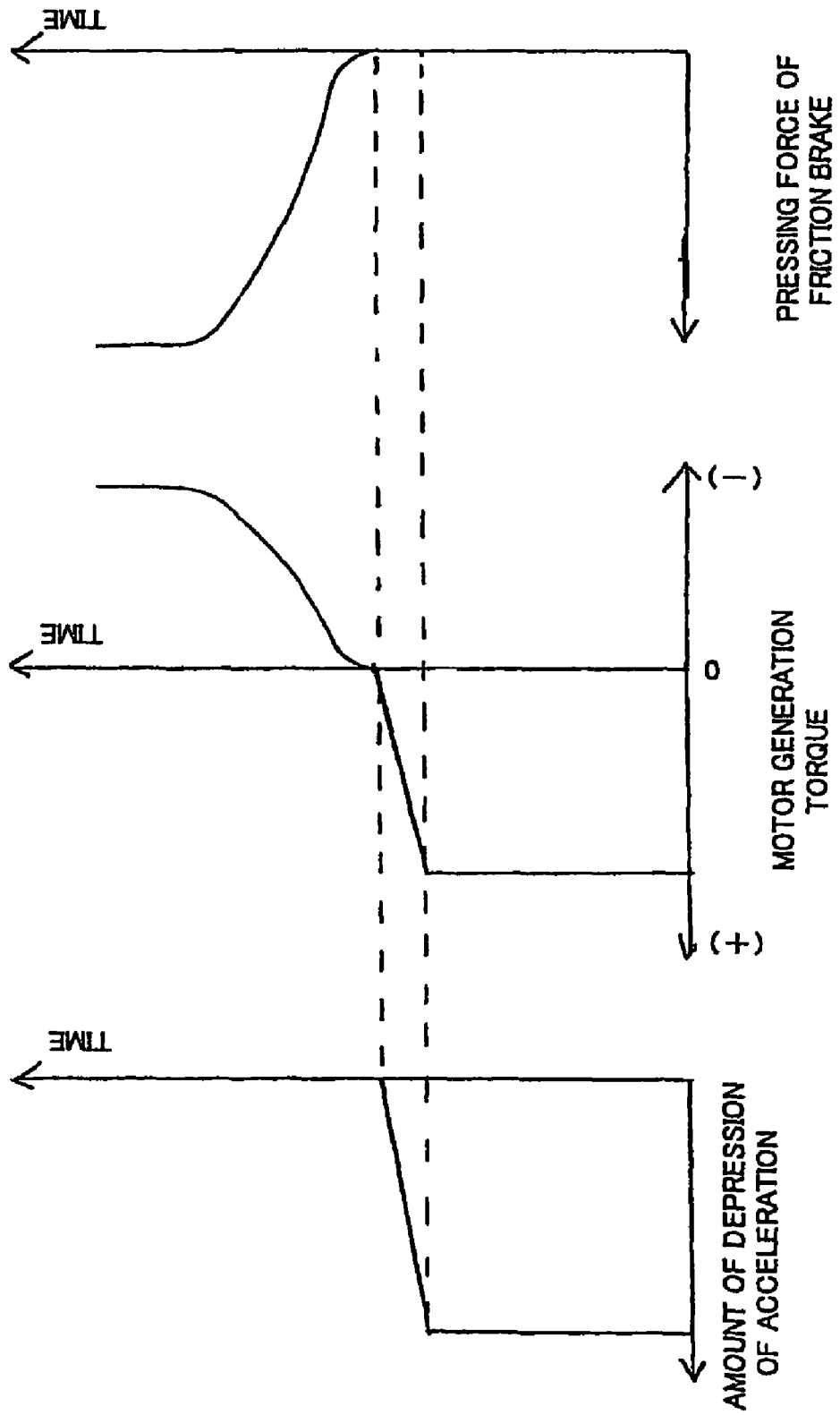
FIG. 9 is graphs illustrating one example of an acceleration pedal depression amount, a torque generated by an electric motor, and a pressing force of a friction brake in freewheeling, as a function of time.

The embodiment according to the present invention is described in detail below with reference to the drawings. FIGS. 1 to 9 are drawings describing the first embodiment. FIG. 1 is a schematic diagram illustrating a configuration of a lawnmower vehicle, being an electric ground working vehicle according to the present embodiment. FIG. 2 is schematic diagram illustrated one example of a configuration in which a brake controller capable of adjusting the left and the right braking force is provided on a service brake in the present embodiment. FIG. 3 is a block diagram illustrating a basic configuration of components of an electrical system including a controller in the lawnmower vehicle according to the present embodiment. FIG. 4 is a block diagram illustrating the controller in FIG. 3 in detail. FIG. 5 is a flow chart illustrating steps for freewheeling brake control in the present embodiment. FIG. 6 is a chart illustrating a relationship between a rotation angle of a steering operating element and a regenerative brake force generated by the left and the right electric motors in the freewheeling brake control. FIG. 7A is a chart illustrating a regenerative brake force between the wheel at the inside of a turn and the wheel at the outside of a turn when turning in the freewheeling brake control with an initial brake at the time of linear advance. FIG. 7B is a chart illustrating the regenerative brake force as is the case in the above with a first example of a turn control. FIG. 7C is a chart illustrating the regenerative brake force as is the case with the above with a second example of a turn control. FIG. 8 is a top view of the left and the right wheels and the caster wheels for describing the turn control when freewheeling. FIG. 9 is graphs illustrating one example of an amount of acceleration pedal depression, a torque generated by an electric motor and a pressing force of a friction brake when freewheeling, as a function of time.

For a power source of a lawnmower vehicle, although there is described a lawnmower vehicle using an electric motor as a power source for the left and the right rear wheels and as a power source of a lawn mowing blade forming a lawnmower, a hydraulic motor may be used for power source of the lawn mowing blade. In addition, an internal combustion engine may be used as a power source of a lawn mowing blade through an appropriate power transmission system.

The electric motor is supplied with electric power and has a function to output a rotation driving force to wheels. The electric motor has also a function as a generator which recovers regenerative energy when a brake is applied to wheels.

The following describes a so-called hybrid riding lawnmower vehicle using a supply source adapted to supply electrical energy to an electric motor or the like as an electric power source unit and an engine and a generator as a power supply source to the electric power source unit. The vehicle may use only the electric power source unit, without mounting the engine and generator. In this case, a mounting space for the engine and other parts can be reduced. The electric power source unit may be a secondary battery which is supplied with charging electric power from the outside and it is possible to use power source units with self-generating function such as a fuel cell or a solar cell along with the secondary battery.

As a lawn mowing rotating tool, being a lawnmower, the following description uses a lawn-mowing blade rotating tool which has a rotary shaft perpendicular to the ground and a plurality of blades arranged around the rotary shaft, with the blades rotating to mow the lawn and the like by cutting it. However, a lawn-mowing reel rotating tool may be used in which a spiral blade, for example, is arranged on a cylinder with a rotary shaft horizontal to the ground to mow the lawn and the like by picking it up.

The arrangement of each component in the lawnmower vehicle described below is one example for the purpose of describing a configuration suited for storing grass mowed by the lawn mowing blade, so that the arrangement thereof may be suitably modified depending on specifications of the lawnmower vehicle. Description is given below with reference to the drawings.

As illustrated in FIG. 1, a lawnmower vehicle 10, being an electric ground working vehicle, is a self-traveling off-road vehicle suited for mowing a lawn. A main frame 12 supports two left and right wheels 14 and 16, being main wheels, two left and right caster wheels 18 and 20, being steering control wheels, a lawnmower (mower) 22, being a working apparatus provided with a lawn mowing blade as a lawn mowing rotating tool, and a seat 24 on which an operator who operates to mow the lawn is seated. Incidentally, the number of the caster wheels 18 and 20 is not limited to two, but one or three caster wheels or more, for example, may be provided on the lawn-mower vehicle 10. In the present embodiment, although the left and right wheels 14 and 16 are taken as the rear wheels and the caster wheels 18 and 20 are taken as the front wheels in the description, the left and right wheels 14 and 16 may be taken as the front wheels and the caster wheels 18 and 20 may be taken as the rear wheels. The left and right wheels 14 and 16 are independently driven by the left and the right axle-side electric motors 26 and 28 respectively. The caster wheels 18 and 20 can be freely steered through 360 degrees or more with a vertical axis as a center.

The main frame 12 forms a framework of the lawnmower vehicle 10, is a member on which each component is mounted, and is of a substantially rectangular flat shape. The left and the right caster wheels 18 and 20 are operably fixed to the same positions in the front and the rear direction on the bottom side of the front end of the main frame 12, and the seat 24 is provided on the upper surface at substantially the center portion thereof. Incidentally, in the present specification, the term "front side" refers to the "front side" of the vehicle, being the left in FIG. 1. The term "rear side" refers to the "rear side" of the vehicle, being the right in FIG. 1. Furthermore, the left and right wheels 14 and 16 are rotatably supported on the bottom side that is the same in position with respect to the front and the rear direction of the main frame 12 and is positioned between the seat 24 and the rear end portion. Still further, the lawnmower 22 is arranged between the left and the right caster wheels 18 and 20 and the left and right wheels 14 and 16 on the bottom side of the main frame 12. The main frame 12 uses one formed into a beam structure or the like using a metallic material having a moderate strength such as a steel material.

On the bottom side of the main frame 12, there are arranged an engine 30, being an internal combustion engine, a generator 32 which is driven by the engine 30 to generate electric power, and a power source unit 34 (refer to FIG. 3) being an electric storage device charged by electric power from the generator 32. In addition, on the bottom side of the main frame 12, there are arranged the axle-side electric motors 26 and 28, being a power source for the left and right wheels 14 and 16, a mower-related electric motor 36, being a power source for the lawn mowing blade of the lawnmower 22, and a power transmission system 38. The power transmission system 38 can transmit the power of the mower-related electric motor 36 to the lawn mowing blade through a universal joint.

The controller 40 which totally controls the operation of the components such as the power source unit 34, the axle-side electric motors 26 and 28 and the mower-related electric motor 36, is arranged in an appropriate position on the upper side or the bottom side of the main frame 12. Since the controller 40 is an electrical circuit, it can be distributed to a plurality of spots, three spots, for example, unlike other mechanism components. The controller 40 can be centralized at a position on the lower side of the seat 24 on the upper surface of the main frame 12, for example. When the controller 40 is distributed, the controllers are connected together by a suitable signal cable or the like. The controller 40 includes a driver circuit, such as an inverter circuit forming a regenerative brake driving unit used in the axle-side electric motors 26 and 28, and a control logic circuit such as a CPU.

On the upper surface of the main frame 12, there are provided a steering operating element 42, being a turn operating element and a steering wheel, a forward acceleration pedal 44, a backward acceleration pedal 46 and a brake pedal 48 forming a service brake, as well as the seat 24. The steering operating element 42 receives a steering angle as a turn instruction input, detects a steering angle through a steering angle sensor 50 (refer to FIG. 3) and outputs the detected signal to the controller 40. Incidentally, a mono-lever structure may be used as the turn operating element. The forward acceleration pedal 44 is an acceleration operating element for instructing a forward acceleration. The backward acceleration pedal 46 is an acceleration operating element for instructing a backward acceleration.

As illustrated in FIG. 2, the brake pedal 48 has a function to brake the left and right wheels 14 and 16 in such a manner that a pressure device 54 provides a pressing force to a rotating member 52 such as a frictional disk integrally rotating with the left and right wheels 14 and 16, to provide frictional force thereto. For this reason, for example, a service brake 56 includes the brake pedal 48, a hydraulic cylinder device 58 driven by depressing the brake pedal 48, the pressure device 54 driven by pressure oil applied from the hydraulic cylinder device 58 through a hydraulic circuit 60, and the rotating member 52 pressed by the pressure device 54. In the example illustrated in FIG. 2, the left and right wheels 14 and 16 are coupled to a rotating shaft 62 of the left and the right axle-side electric motors 26 and 28 and the rotating member 52 is fixed to the rotating shaft 62.

The rotating member 52 is provided with pressing force through a second pressing member 68 by hydraulic pressure provided by a brake controller 64 through a hydraulic circuit 66, or push and pull forces provided by a push and pull mechanism (not shown) to be provided with frictional force, thereby applying braking force to the rotating member 52. In this case, the brake controller 64 can independently provide the left and right wheels 14 and 16 with braking force. As illustrated in FIG. 2, two brake controllers 64 may be provided in correspondence with the left and right wheels 14 and 16, or one brake controller 64 may be provided in common for the left and right wheels 14 and 16. Although the common rotating member 52 is provided with frictional force both by the configuration in which braking force is provided by the brake controller 64 and by the configuration in which braking force is provided by depressing the brake pedal 48, members which are different from each other and coupled to the left and right wheels 14 and 16 may be provided with frictional force. Furthermore, it is possible to use a configuration in which a drum brake is formed instead of the second pressing member 68, to enable change in the amount of extension of a wheel cylinder for pressing a brake shoe against a brake drum by changing the magnitude of hydraulic pressure. In this case, a hydraulic pressure adjusting mechanism which can be controlled by the brake controller 64 is provided in the hydraulic circuit 66. The brake controller 64 is controlled by the controller 40 (refer to FIG. 1) as described later.

Returning to FIG. 1, on the back of the seat 24 there is provided a grass tank 70 for storing grass such as lawn mowed by the lawn mowing blade of the lawnmower 22. A slope called a mower duct 72 is provided between the lawnmower 22 and the grass tank 70. One end of the mower duct 72 is opened at a mower deck 74 forming the lawnmower 22 and the other end thereof is opened at grass tank 70. A grass fan 76 for blowing grass clippings such as mowed lawn and others is provided at the center between the mower deck 74 and the grass tank 70. The lawnmower 22 drives the lawn mowing blade to perform a lawn mowing operation being a ground work.

The mower duct 72 is provided to pass between the left and right wheels 14 and 16 and at the substantial center portion of the main frame 12. At least parts of the axle-side electric motors 26 and 28, being a power source for the left and right wheels 14 and 16, are arranged in the wheel rims of the left and right wheels 14 and 16.

Referring to FIG. 3, the components and a relationship therebetween are described in detail below. In FIG. 3, the same components as those described in FIGS. 1 and 2 are given the same reference numerals. In the following, a description is given using the reference numerals in FIGS. 1 and 2 if required.

The engine 30 is a power source to cause the generator 32 to rotate and generate electric power required for the operation of the lawnmower vehicle 10, and the output shaft thereof is connected to the generator 32. As the engine 30, there may be used an internal combustion engine using gasoline, diesel fuel, liquefied propane gas, natural gas or the like, for example, as fuel.

The generator 32 has a function to convert the mechanical energy of the engine 30 into electrical energy and is generally referred to as an alternator. In addition, the generator 32 can be supplied with electric power to function as a motor and be used as a starter using its function. In FIG. 3, the term "starter" denotes another function of the generator 32. Needless to say, a starter device may be mounted separately from the generator 32.

The power source unit 34 is a secondary battery having a function to store electrical energy generated by the generator 32 and supply electric power to a load such as the axle-side electric motors 26 and 28 if required. As the power source unit 34, there may be used a lead storage battery, a lithium ion battery pack, a nickel metal hydride battery pack or a capacitor.

The power source unit 34 may be supplied with charge electric power from an external power source separately from an electric power supply system of the engine 30 and the generator 32. In FIG. 3, the term "AC 110V or other power source units" denotes a system to which a charge electric power is supplied from an external power source using a so-called plug-in. Thereby, the power source unit 34 can be fully charged with the external power source when the lawnmower vehicle 10 is not in operation. The lawnmower vehicle 10 can be operated only by the electric power of the power source unit 34 without operating the engine 30 at the time of performing a lawn mowing job.

The mower-related electric motor 36 is connected to the power source unit 34 and has a function to rotate the lawn mowing blade of the lawnmower 22. The mower-related electric motor 36 is controlled by turning on and off a mower starting switch 78 provided near the seat 24. Specifically, the controller 40 detects the on-off state of the mower starting switch 78 and controls the operation of a driver for the mower-related electric motor 36 in accordance with the detection to operate or stop the mower-related electric motor 36. A seat switch 80 that detects whether a driver is sitting on the seat 24 is provided at the periphery of the seat 24 of the lawnmower vehicle 10. If it is determined from the detection signal of the seat switch 80 that the driver is not sitting on the seat 24, the controller 40 can perform control so that a starting control, including starting the axle-side electric motors 26 and 28, can be made ineffective even if a key switch, being a system starting switch, is turned on.

The steering operating element 42 is a turn operating element for instructing turn, and is a circular or imperfectly circular steering wheel, for example, and has a function to adjust the direction in which the left and the right wheels 14 and 16 are turned by rotating or swinging the steering operating element 42. For example, if the steering operating element 42 is a steering wheel, the steering operating element 42 can rotate clockwise or counterclockwise at any angle with its rotation axis as a center. The amount of operation of the steering operating element 42, i.e., a steering position, is transmitted to the controller 40 using the steering angle sensor 50 to control the operation of the axle-side electric motors 26 and 28 connected to the left and the right wheels 14 and 16.

Although the forward and the backward acceleration pedals 44 and 46 are separately provided, a single acceleration pedal may be commonly used for both a forward and a backward operation. For example, the acceleration pedal is swingably supported on a fixed horizontal axis to become a swingable pedal whose front and back side can be depressed. Depressing the front portion instructs forward, and depressing the back portion instructs backward. The forward and the backward acceleration pedals 44 and 46 can be depressed to any degree. The amount of depression of the acceleration pedals 44 and 46 is detected by an acceleration depression sensor 82, and the signal from the acceleration depression sensor 82 is transmitted to the controller 40 to control the operation of the axle-side electric motors 26 and 28 connected to the left and the right wheels 14 and 16.

An electric sensor such as a potentiometer or encoder may be used to detect the angle of the acceleration depression sensor 82 corresponding to the forward and the backward acceleration pedals 44 and 46. If the controller 40 determines that the forward and the backward acceleration pedals 44 and 46 are depressed at the same time, the controller 40 can stop the rotation of the axle-side electric motors 26 and 28 to stop the lawnmower vehicle 10. In this case, safety can be effectively assured. Moreover, even if an ambiguous instruction is issued in which both the acceleration pedals 44 and 46 are depressed at the same time when the lawnmower vehicle 10 stops traveling, there is no need to provide a mechanical interlock, being a mechanical locking device for preventing the acceleration pedals 44 and 46 from being further depressed, which makes it easy to reduce the cost.

Even if a key switch (not shown), being the system starting switch, is erroneously turned on for operation with the acceleration pedals 44 and 46 depressed, the vehicle can be prevented from starting suddenly without user intending it. That is to say, the controller 40 detects vehicle speed from the detection value of rotation speed of the axle-side electric motors 26 and 28 when the key switch is turned off. If the key switch is turned off when the controller 40 determines that the acceleration pedals 44 and 46 are depressed at a vehicle speed of zero, even though the key switch is turned on after that, the controller 40 can control so as to nullify a starting control including starting the rotation of the axle-side electric motors 26 and 28. According to this configuration, if the key switch is erroneously turned on, the vehicle can be prevented from starting. In this case, the controller 40 performs effective starting control corresponding to the key switch being turned on as long as it is determined that the amount of depression of the acceleration pedals 44 and 46 is zero, in other words, the target rotating speed of the axle-side electric motors 26 and 28 is zero. For example, if it is determined from the state detection by the potentiometer detecting the amount of depression of the acceleration pedals 44 and 46 and an operation recognition limit switch that there is in an area to start the motors, where the acceleration pedals 44 and 46 are depressed, the axle-side electric motors 26 and 28 are not started even if the key switch is turned from off to on. In this case, "warning" may be displayed on a display panel provided in the vicinity of the seat 24, or a warning may be issued by a buzzer or a lamp. The operation recognition switch for recognizing an operation state may be provided on the brake pedal 48 and as a result the controller 40 can effectively implement starting control by the key switch being turned on as long as the brake pedal 48 is turned on.

The operation of the axle-side electric motors 26 and 28 connected to the left and the right wheels 14 and 16 is controlled according to the amount of operation of the steering operating element 42 and the amount of depression of the acceleration pedals 44 and 46. The controller 40 sets the average speed of both rotating speeds of the left and the right axle-side electric motors 26 and 28 based on the amount of depression of the acceleration pedals 44 and 46 and sets a difference in speed between the left and the right axle-side electric motors 26 and 28 based on the amount of operation of the steering operating element 42. Incidentally, the speed ratio between the left and the right axle-side electric motors 26 and 28 can be set based on the amount of operation of the steering operating element 42.

For example, depressing the forward acceleration pedal 44 with the steering operating element 42 in a neutral position instructing a moving straight state rotates the wheels 14 and 16 in the forward direction. The larger the amount of depression, the higher the rotating speed of the wheels 14 and 16, increasing the forward speed. On the other hand, depressing the backward acceleration pedal 46 rotates the wheels 14 and 16 in the backward direction. The larger the amount of depression, the higher the rotating speed of the wheels 14 and 16, increasing the backward speed. As a result, the lawnmower vehicle 10 can be made to travel forward and backward at any speed.

Rotating the steering operating element 42 clockwise with the forward acceleration pedal 44 depressed appropriately makes the rotating speed of the left wheel 14 greater than that of the right wheel 16, enabling the lawnmower vehicle 10 to be turned to the right while traveling. The greater the amount of rotation of the steering operating element 42, the greater the difference between the rotating speeds of the left and the right wheels 14 and 16. On the other hand, the smaller the amount of rotation of the steering operating element 42, the smaller the difference between the rotating speeds of the left and the right wheels 14 and 16. This enables a turning radius to be adjusted. Rotating the steering operating element 42 counterclockwise makes the rotating speed of the right wheel 16 greater than that of the left wheel 14, enabling the lawnmower vehicle 10 to be turned to the left while traveling.

Varying the amount of depression of the forward acceleration pedal 44 with the forward acceleration pedal depressed allows the lawnmower vehicle 10 to be turned while varying a traveling speed. Operating the steering operating element 42 with the backward acceleration pedal 46 depressed allows the lawnmower vehicle 10 to be turned while traveling backward.

Thus, the rotation of the steering operating element 42 and the depression of the acceleration pedals 44 and 46 enable the rotating speeds of the left and the right axle-side electric motors 26 and 28 to be independently adjusted, thereby causing the lawnmower vehicle 10 to travel and turn.

The axle-side electric motors 26 and 28 are motors/generators for driving the left and the right wheels 14 and 16 being main driving wheels as stated above. In other words, the output shafts of the axle-side electric motors 26 and 28 are independently connected to the axles of the left and the right wheels 14 and 16 respectively. The axle-side electric motors 26 and 28 are supplied with electric power from the power source unit 34 to be rotated and drive the left and the right wheels 14 and 16. "While the vehicle is freewheeling" or "while the brake is applied by depressing the pedal," that is, while the acceleration pedals 44 and 46 are not depressed during traveling, the axle-side electric motors 26 and 28 function as generators to recover regenerative energy through an electric power regenerating unit 84, charging the power source unit 34.

A charge monitor system for monitoring a charging state of the power source unit 34 is provided, which corresponds to the power source unit 34. As the axle-side electric motors 26 and 28, there may be used a brushless DC rotary machine or an induction rotary machine. The phrase "while the brake is applied by depressing the pedal" means "while the brake is applied to the left and the right wheels 14 and 16 by the service brake 56 using the brake pedal 48." In addition, the phrase "while the vehicle is freewheeling" means "while the vehicle slows down in speed by itself due to running resistance applied to the wheels 14 and 16 from the ground when the acceleration pedals 44 and 46 are not depressed during traveling." The illustration of the electric motors 26 and 28 in FIG. 3 depicts the right axle motor (or the left axle motor) and a regenerative braking unit, but the illustration intends to describe, for the sake of better understanding, that the electric motors 26 and 28 have functions of a motor and a regenerative braking unit. Actually, however, the respective electric motors 26 and 28 realize those functions.

The controller 40 is a circuit having a function to control the entire operation of the lawnmower vehicle 10. Particularly, the controller 40 has a function to control the operation of the axle-side electric motors 26 and 28 according to the state of the steering operating element 42 and the acceleration pedals 44 and 46. That is to say, the controller 40 includes a right-axle-motor driver circuit 86 such as an inverter circuit used for driving the right axle-side electric motor 28 and the electric power regenerating unit 84, being the regenerative brake driving unit, used in the right axle-side electric motor 28. The driver circuit 86 and the electric power regenerating unit 84 which are used for the right axle-side electric motor 28 correspond to the regenerative brake driving unit.

The controller 40 further includes a left-axle-motor driver circuit 88 such as an inverter circuit used for driving the left axle-side electric motor 26 and the electric power regenerating unit 84 for the left axle-side electric motor 26. The driver circuit 88 and the electric power regenerating unit 84 which are used for the left axle-side electric motor 26 correspond to the regenerative brake driving unit. For this reason, the controller 40 controls the electric power regenerating unit 84 and the driver circuits 86 and 88 so that electric power is recovered from the left and the right axle-side electric motors 26 and 28 to the power source unit 34 while the vehicle is freewheeling or while the brake is applied, that is, while the acceleration pedals 44 and 46 are not depressed during traveling, whereby the left and the right wheels 14 and 16 are regeneratively braked.

The right and the left-axle-motor driver circuits 86 and 88 drive the right and the left electric motors 28 and 26 in response to the control signal from the CPU of the controller 40. The right and the left electric motors 28 and 26 feed back signals representing rotating speed, rotating direction, current value and others to the controller 40. Both functions of the right-axle-motor driver circuit 86 for the right axle-side electric motor 28 and the electric power regenerating unit 84 may be provided in a circuit that is the regenerative brake driving unit including an inverter. Similarly, both functions of the left-axle-motor driver circuit 88 for the left axle-side electric motor 26 and the electric power regenerating unit 84 may be provided in a circuit that is the regenerative brake driving unit including an inverter. In this case also, the controller 40 controls the regenerative brake driving unit while the vehicle is freewheeling or while the brake is applied, thereby regeneratively braking the left and the right wheels 14 and 16. The thus configured lawnmower vehicle 10 is capable of freely steering caster wheels 18 and 20 and rotating the left and right wheels 14 and 16 in the direction opposite to each other at the same speed, so that the lawnmower vehicle 10 can pivotally turn with a central position on the axle connecting the left and right wheels 14 and 16 between the left and right wheels 14 and 16 as a center, which is called "turn in place".

While the wheels are regeneratively braked, the controller 40 outputs the control signal to the brake controller 64 and provides the rotating member 52, provided in correspondence with the left and right wheels 14 and 16, through the second pressing member 68 with pressing force and with frictional force using the hydraulic pressure or the push and pull forces. The hydraulic pressure is provided by the brake controller 64 through the hydraulic circuit 66. The push and pull forces is provided through the push and pull mechanism. Accordingly, it is enable to brake the left and right wheels 14 and 16 independently. A left friction brake 90 in FIG. 3 is formed of the rotating member 52 for the left wheel 14 and the second pressing member 68, and a right friction brake 92 is formed of the rotating member 52 for the right wheel 16 and the second pressing member 68. While the wheels are regeneratively braked, the controller 40 can be configured to brake the wheels 14 and 16 with only the regenerative brake forces of the electric motors 26 and 28. The driver can operate the operation unit to select the braking force provided for the wheels 14 and 16 at the time of regenerative braking between the regenerative brake only or the combination of the regenerative brake force and the friction brake force by the brake controller 64.

The controller 40 may be configured such that the controller outputs the control signal to the brake controller 64 while electric power is being regenerated from the electric motors 26 and 28, and outputs the electric signal from the brake controller 64 to an actuator provided in correspondence with the left and the right wheels 14 and 16, and the actuator can provide pressing force for the rotating member 52 provided in correspondence with the left and the right wheels 14 and 16, thereby enabling the left and the right wheels 14 and 16 to be independently controlled by frictional force acting based on the pressing force between the rotating member 52 and the actuator. In this case, the rotating member 52 for the right wheel 16 and the actuator form a right friction brake. The rotating member 52 for the left wheel 14 and the actuator form a left friction brake.

If the right friction brake 92 and the left friction brake 90 are hydraulic type, the brake controller 64 may electrically control an electromagnetic proportional valve or electromagnetic valve, i.e., on-off valve with the PWM control system to adjust friction brake force due to hydraulic pressure. In this case, electrically varying the amount of opening and closing the valve enables the friction brake force to be adjusted.

The controller 40 has a function to control the operation of the mower-related electric motor 36, lifting of the lawnmower 22 and starting and stopping of the engine 30. For this reason, signals from the steering angle sensor 50 and the acceleration depression sensor 82 described above, a signal representing the on-and-off state of the mower starting switch 78, and various signals for detecting the state of the lawnmower vehicle 10, are inputted to the controller 40. The signals include a signal from a slope sensor 94 which detects an angle tilted with respect to the horizontal plane and the front and the back direction of the lawnmower vehicle 10. For example, the slope sensor 94 can detect an angle at which a virtual plane, including to two positions located at the same positions of the vehicle 10 with respect to the upper and the lower direction apart in the front and the back of the vehicle, is tilted with respect to the horizontal plane. It is made possible to detect whether the vehicle is ascending or descending, and a tilt angle of a slope, from the signal from the slope sensor 94.

The controller 40 is formed of a control logic circuit such as a CPU and a memory portion for processing the vehicle-state detection signal of the lawnmower vehicle 10 to produce the control signal for each component, a driver circuit, being a driving unit for driving the axle-side electric motors 26 and 28, the mower-related electric motor 36 and others. The controller 40 may be formed of a plurality of circuit blocks. Particularly, the control logic circuit such as a CPU and the memory portion may be formed of a computer suited for mounting on a vehicle.

The axle-side electric motors 26 and 28 may be subjected to, for example, a rotating speed control with a traveling speed as a target value. Particularly, at the time of turning the vehicle, the traveling speed is determined by an average rotating speed, being an average value of rotating speed of the left and the right wheels 14 and 16, and the turning radius is determined by a rotating-speed difference, being a difference in rotating speed between the left and the right wheels 14 and 16. Thus, the axle-side electric motors 26 and 28 are subjected to control related to each other and to a target rotating speed different from each other. Incidentally, while the vehicle is moving in a straight line instead of turning, the traveling speed is determined depending on a ground load, so that the axle-side electric motors 26 and 28 are subjected to torque control with an output torque as a target value. Vector control may be used as the torque control. The vector control is performed such that current flowing in the direction of a reference axis with the direction of magnetic flux of a motor as a reference, and current flowing in the direction of the axis orthogonal to the reference axis, are independently adjusted to control magnetic flux and torque. The vector control may be performed by sensor-less vector control.

In the following, there is described freewheeling brake control performed while the vehicle is freewheeling and while the brake is applied by depressing the brake pedal, i.e., while the acceleration pedals 44 and 46 are not operated during traveling. As described above, in a conventional riding electric lawnmower vehicle in which the left and the right wheels are independently driven by the left and the right electric motors to enable the vehicle to be turned by a difference in rotating speed between the left and the right electric motors, while the vehicle is freewheeling, i.e., while the acceleration pedals are not depressed, the left and the right electric motors stop rotating and do not generate a difference in rotating speed between the left and the right wheels, so that it is difficult for the driver to turn the vehicle in the desired direction.

In the present embodiment, on the other hand, while the vehicle is freewheeling or while the brake is applied by depressing the brake pedal and when the vehicle is instructed to turn from the steering operating element 42, that is to say, when the steering angle detected by the steering angle sensor 50 is not smaller than a predetermined value, for example, when the steering angle is not zero, the controller 40 controls the brake force of the wheels 14 and 16 so that the brake force of the wheel at the inside of a turn can be made greater than the brake force of the wheel at the outside of a turn. For this reason, the controller 40 has an integrated control unit 96 formed of a CPU and others. The integrated control unit 96 outputs the control signal to the electric power regenerating unit 84 corresponding to the left and the right wheels 14 and 16. Incidentally, the integrated control unit 96 and the electric power regenerating unit 84 corresponding to the left and the right wheels 14 and 16 may be formed of a single electric power regenerating unit being a circuit including the CPU.

In the following, there is described control performed when the vehicle is turned while the vehicle is freewheeling or while the brake is applied by depressing the pedal. FIG. 4 is a detailed block diagram of the controller 40. The controller 40 includes an integrated control unit 96. The integrated control unit 96 includes a motor rotating speed determining unit 100, an acceleration depression determining unit (not shown), a turn and moving-straight instruction-input determining unit 102, a turning-direction-amount determining unit 104 and a left and right wheel brake-amount setting unit 106. The signal from the integrated control unit 96 is outputted to the electric power regenerating unit 84 corresponding to the left and the right wheels 14 and 16. At the time of regenerative braking by the left and the right axle-side electric motors 26 and 28, a regenerative electric power is supplied to the electric power regenerating unit 84 through at least one of the right and the left-axle-motor driver circuits 86 and 88, and charged thereto. The right and the left-axle-motor driver circuits 86 and 88 are controlled by the electric power regenerating units 84 in response to the signal outputted from the integrated control unit 96. Motor sensors 108 for detecting the rotating speed and the rotating direction of the electric motors 26 and 28 are provided on the left and the right electric motors 26 and 28, and the detected signals of the motor sensors 108 are inputted to the controller 40. In the following description and in FIG. 3, the same components as those illustrated in FIGS. 1 and 2 are denoted by the same reference numerals.

The acceleration depression determining unit determines whether the acceleration pedals 44 and 46 are not operated, i.e., whether the acceleration pedals 44 and 46 are not depressed. The motor rotating speed determining unit 100 determines whether the electric motors 26 and 28 are rotating or not rotating from the signals inputted from the motor sensors 108. The turn and moving-straight instruction-input determining unit 102 determines whether the turn instructions are inputted or the steering angle of the steering operating element 42 is not smaller than a predetermined angle. The turning-direction-amount determining unit 104 determines a steering direction and a steering angle, which are the operation direction and the operation amount of the steering operating element 42, respectively. The left and right wheel brake-amount setting unit 106 determines that there is a case wherein the steering operating element 42 is steered while the vehicle is freewheeling, or while the brake is applied by depressing the pedal if the acceleration pedals 44 and 46 are not operated, and the motors are rotating and the turn instructions are inputted. And the left and right wheel brake-amount setting unit 106 sets the brake forces of the left and the right wheels 14 and 16 corresponding to the steering direction and the steering angle. A brake force distribution setting unit (not shown) of the integrated control unit 96 sets distribution at which the set brake force is distributed according to a predetermined distribution ratio, to a regenerative brake force portion and a brake force portion for the right and the left friction brakes 92 and 90. The controller 40 controls the brake of the left and the right wheels 14 and 16 with the set distribution using only the regenerative brake force or using the regenerative brake force and the brake force for the right and the left friction brakes 92 and 90, thereby enabling a turn while the vehicle is freewheeling or while the brake is applied by depressing the pedal. If the brake force distribution setting unit is not provided on the controller 40, the controller 40 may determine that there is a case wherein the steering operating element 42 is steered while the vehicle is freewheeling, or while the brake is applied by depressing the pedal, and the controller 40 may regeneratively brake the left and the right axle-side electric motors 26 and 28 corresponding to the left and the right wheels 14 and 16 according to the brake force set by the left and right wheel brake-amount setting unit 106, thereby enabling the turn.

Since the integrated control unit 96 is a part of the controller 40, the integrated control unit 96 can be formed of a plurality of circuit blocks and of a vehicle-mounted computer. The above functions can be realized by software, specifically by executing a freewheeling brake control program. Needless to say, some of the above functions can be realized by hardware. The controller 40 includes a storage unit for storing a lawnmower vehicle control program.

The operation of the configuration described in FIG. 4 is described below with reference to the flow chart in FIG. 5. FIG. 5 is a flow chart illustrating steps for controlling the brake force of the left and the right wheels 14 and 16 at the time of performing the moving-straight and the turn while the lawnmower vehicle 10 is freewheeling, or while the brake is applied by depressing the pedal. Each step corresponds to each process step related to a freewheeling brake control process in the lawnmower vehicle control program. The following is described using the reference numerals in FIGS. 1 to 4. The flow chart of FIG. 5 proceeds simultaneously with a flow chart for performing another lawnmower vehicle control program used for performing a normal acceleration traveling using the operating elements such as the acceleration pedals 44 and 46 and others.

When the lawnmower vehicle 10 starts and then the freewheeling brake control program starts, the acceleration depression determining unit determines whether the acceleration pedals 44 and 46 are not operated, i.e., whether the acceleration pedals 44 and 46 are not depressed (step S1). If the acceleration depression determining unit determines that the acceleration pedals 44 and 46 are not operated, the motor rotating speed determining unit 100 determines whether the electric motors 26 and 28 are rotating from the signals inputted from the motor sensors 108 (step S2). If the electric motors 26 and 28 are rotating, the motor rotating speed determining unit 100 determines that the vehicle is freewheeling or the brake is applied by depressing the pedal, and the integrated control unit 96 outputs an instruction signal to the electric power regenerating unit 84 to cause the electric power regenerating unit 84 to output the control signal to the left and the right-axle-motor driver circuits 88 and 86. This causes electric power to be recovered from the left and the right axle-side electric motors 26 and 28 to the power source unit 34, performing an initial regenerative brake by a predetermined initial brake force setting, that is, turning on a regenerative brake (step S3). In this case, the left and the right axle-side electric motors 26 and 28 apply the same regenerative brake force to the left and the right wheels 14 and 16.

The turn and moving-straight instruction-input determining unit 102 determines whether the turn instructions are inputted (step S4). If the turn and moving-straight instruction-input determining unit 102 determines that the turn instructions are not inputted, i.e., that the moving-straight instructions are inputted, the step returns to step S1 with the left and the right axle-side electric motors 26 and 28 applying the same regenerative brake force to the left and the right wheels 14 and 16 in step S5. On the other hand, if the turn and moving-straight instruction-input determining unit 102 determines that the turn instructions are inputted in step S4, the turning-direction-amount determining unit 104 determines a steering direction of the steering operating element 42 (step S6). For example, if the turning-direction-amount determining unit 104 determines that the steering operating element 42 is turned to the right, the left and right wheel brake-amount setting unit 106 sets target brake forces of the left and the right wheels 14 and 16 corresponding to the steering direction and the steering angle in step S7. In this case, the target brake force of the right wheel 16 is set greater than the target brake force of the left wheel 14. In step S8, a brake force is provided for the left and the right wheels 14 and 16 by increasing the target brake force of the right wheel 16 and/or decreasing the target brake force of the left wheel 14, thereby turning the lawnmower vehicle 10 to the right, and the process returns to step S1.

On the other hand, in step S6, if the turning-direction-amount determining unit 104 determines that the steering operating element 42 is turned to the left, the left and right wheel brake-amount setting unit 106 sets target brake forces of the left and the right wheels 14 and 16 corresponding to the steering direction and the steering angle in step S9. In this case, the target brake force of the left wheel 14 is set greater than the target brake force of the right wheel 16. In step S10, a brake force is provided for the left and the right wheels 14 and 16 by increasing the target brake force of the left wheel 14 and/or decreasing the target brake force of the right wheel 16, thereby turning the lawnmower vehicle 10 to the left, and the process returns to step S1. Incidentally, in steps S8 and S10, the brake forces of the left and the right wheels 14 and 16 can be made different from each other using the regenerative brake force and/or the friction brake force generated by the friction brakes 90 and 92.

In steps S7 to S10, when the brake forces of the left and the right wheels 14 and 16 are made different from each other, for example, it is possible to set a brake force with the relationship illustrated in FIG. 6. FIGS. 7A, 7B and 7C illustrate a relationship of the regenerative brake force to the rotating angle of the steering operating element 42 at the time of freewheeling brake control. The origin of the abscissa in FIGS. 7A, 7B and 7C represents a neutral position (or a neutral position of a steering wheel) that is a steering position of the steering operating element 42 indicating a moving-straight state. FIGS. 7A, 7B and 7C show that the rotating angle of the steering operating element 42 to the right, i.e., the clockwise direction, increases toward the right side and the rotating angle of the steering operating element 42 to the left, i.e., the counterclockwise direction increases toward the left side. The ordinate of FIG. 6 represents the regenerative brake force generated by the right axle-side electric motor 28 for the right wheel 16 and the left axle-side electric motor 26 for the left wheel 14 and the regenerative brake force increases toward the upper side. In FIGS. 7A, 7B and 7C, a solid line α and an alternate long and two short dashes line δ represent the regenerative brake force generated by the right axle-side electric motor 28. A broken line β and an alternate long and short dash line γ represent the regenerative brake force generated by the left axle-side electric motor 26.

In other words, when the rotation angle of the steering operating element 42 is increased rightward, the regenerative brake force generated by the right axle-side electric motor 28 is linearly increased as the rotation angle increases and the regenerative brake force generated by the left axle-side electric motor 26 is kept constant. The constant value is an initial regenerative brake force equally generated by the left and the right wheels 14 and 16 when the steering operating element 42 is in a neutral position.

On the contrary, when the rotation angle of the steering operating element 42 is increased leftward, the regenerative brake force generated by the left axle-side electric motor 26 is linearly increased as the rotation angle increases and the regenerative brake force generated by the right axle-side electric motor 28 is kept constant. Data of a map representing such a relationship between the rotation angle and the regenerative brake force is previously stored in a storage unit of the controller 40 and read when the left and right wheel brake-amount setting unit 106 sets the amount of brake. The relationship between the rotation angle of the steering operating element 42 and the regenerative brake force to be increased may be increased in a curve instead of linearly. Thus, while the vehicle is freewheeling or the brake is applied, the brake forces of the left and the right wheels 14 and 16 can be made different from each other, so that the vehicle can be turned by operating the steering operating element 42, although the acceleration pedals 44 and 46 are not operated.

Referring to FIGS. 7A, 7B, 7C, and 8, there are described below three examples in which the brake forces of the left and the right wheels 14 and 16 are set at the time of freewheeling brake control in the cases where mainly the vehicle linearly moves and turns to the right. FIG. 7A is a chart illustrating an initial brake state during the moving-straight of the vehicle. FIG. 7B is a chart illustrating a first example of turn control. FIG. 7C is a chart illustrating a second example of turn control. FIG. 8 is a chart illustrating the left and the right wheels 14 and 16 and the caster wheels 18 and 20 in the case where the vehicle turns to the right in the arrow "v" direction. Arrows q1 and q2 represent the magnitude of brake force applied to the left and the right wheels 14 and 16. As illustrated in FIG. 7A, the regenerative brake force is equally applied to the left and the right wheels 14 and 16 when the vehicle linearly moves and freewheels, i.e., when the acceleration pedals 44 and 46 are not operated. This corresponds to the step S3 in FIG. 5.

For the case of the first example of turn control in FIG. 7B, if the vehicle freewheels and the steering operating element 42 instructs the vehicle to turn to the right, the brake force q1 of the right wheel 16 at the inside of a turn is made greater and the brake force of the left wheel 14 at the outside of a turn remains unchanged as the initial brake force. As a result, the lawnmower vehicle 10 can be turned to the right.

For the case of the second example of turn control in FIG. 7C, if the vehicle freewheels and the steering operating element 42 instructs the vehicle to turn to the right, the brake force q1 of the right wheel 16 at the inside of a turn is made greater and the brake force of the left wheel 14 at the outside of a turn is made smaller than the initial brake force. In this case, however, the average value of brake forces of the left and the right wheels 14 and 16 is made greater than the initial brake force obtained from the left and the right axle-side electric motors 26 and 28 in moving-straight of the vehicle. That is to say, for both cases in FIGS. 7B and 7C, the controller 40 controls the brake forces of the left and the right wheels 14 and 16 so that the sum of the brake forces of the left and the right wheels 14 and 16 obtained when the acceleration pedals 44 and 46 are not operated during traveling and the steering operating element 42 instructs the vehicle to turn can be greater than a moving-straight regenerative brake force, being the sum of the initial brake forces obtained from the left and the right electric motors 26 and 28 when the acceleration pedals 44 and 46 are not operated during traveling and the steering operating element 42 instructs the vehicle to linearly move. This prevents the brake forces of the left and the right wheels 14 and 16 from being smaller than the initial brake forces and prevents the vehicle speed from being increased, enabling the vehicle to be driven while being turned. Although the above description handles the case where the vehicle turns to the right, the same holds true for the case where the vehicle turns to the left, except that the brake forces are reverse between the left and the right wheels 14 and 16.

FIGS. 7A, 7B and 7C show average brake forces Q1 and Q2 between the right and the left wheels 16 and 14 in turn control and a regenerative brake force P being the initial brake force in a moving-straight, for better understanding of the magnitudes between the brake forces. In other words, the average brake forces Q1 and Q2 in the turn control illustrated in FIGS. 7B and 7C are made greater than the regenerative brake force P in a moving-straight illustrated in FIG. 7A (in the figure, Q1 and Q2 are positioned lower than P).

When the brake force of the wheels 14 and 16 is increased from the initial state and when the acceleration pedals 44 and 46 are not operated during traveling and the steering operating element 42 instructs the vehicle to turn, the controller 40 may control the regenerative brake driving unit corresponding to at least one of the left and the right electric motors 26 and 28 so that a turn-inside regenerative brake force can be made greater than a turn-outside regenerative brake force. In this case, the turn-inside regenerative brake force is obtained from the left or the right axle-side electric motor 26 or 28 corresponding to the wheel at the inside of a turn, among the left and the right wheels 14 and 16. The turn-outside regenerative brake force is obtained from the left or the right axle-side electric motor 26 or 28 corresponding to the wheels at the outside of a turn. In the same case, the controller 40 and the brake controller 64 may control the friction brakes 90 and 92, being friction brake units, so that a turn-inside friction brake force obtained from the friction brakes 90 and 92, being the friction brake unit, corresponding to the wheel at the inside of a turn, among the left and the right wheels 14 and 16, can be made greater than a turn-outside friction brake force obtained from the friction brakes 90 and 92 corresponding to the wheel at the outside of a turn. Both of regenerative brake control and friction brake control may be performed at the same time. The brake controller 64 includes a micro computer with a memory and a driving unit with a hydraulic cylinder device or the like controlled by the micro computer. Incidentally, the brake controller 64 may include only the driving unit and the driving unit may be controlled by the controller 40.

In the freewheeling turn control, the regenerative brake force generated by the axle-side electric motors 26 and 28 may be gradually increased, as described in FIG. 9. An upper portion of FIG. 9 is a graph showing a relationship between the amount of depression of the acceleration pedals 44 and 46 and time. An middle portion of FIG. 9 is a graph showing a relationship between a torque generated by the axle-side electric motors 26 and 28 and time. An lower portion of FIG. 9 is a graph showing a relationship between a pressing force for pressing the rotating member 52 corresponding to the friction brake force generated by the friction brakes 90 and 92 (friction brake pressing force) and time. In the middle portion of FIG. 9, a plus (+) represents that a torque generated by the axle-side electric motors 26 and 28 increases toward the upper side and a minus (−) represents that a regenerative torque increases toward the lower side in the case where the axle-side electric motors 26 and 28 generate electricity, i.e., the axle-side electric motors 26 and 28 generate the regenerative brake force.

Thus, being not operated after slightly depressing the acceleration pedals 44 and 46 causes the axle-side electric motors 26 and 28 to regeneratively brake, and increases the friction brake pressing force. On the other hand, a gradual-change control may be performed in which the regenerative brake force is gradually increased with time and the friction brake pressing force is gradually increased with time. In this case, the ratio of the regenerative brake force and the friction brake pressing force can be gradually decreased with time, which prevents sensory acceleration at the time of stopping the lawnmower vehicle 10, i.e., shock, from being excessively increased.

Data representing a map of the relationship between the regenerative brake force generated by the axle-side electric motors 26 and 28 and the time, and that between the friction brake pressing force and the time in FIG. 9, obtained while the acceleration pedals 44 and 46 are not operated, may be stored in a storage unit. The data is read properly from the storage unit by the controller 40 when the brake force is set. One of the regenerative brake force and the friction brake force can be gradually increased, or increased not in a curve as illustrated in FIG. 9, but linearly.

In the present embodiment, the controller 40 can vary, i.e., increases or decreases, the setting for the brake forces of the left and the right wheels 14 and 16 according to estimation of a vehicle speed corresponding to the rotating speed of the axle-side electric motors 26 and 28, making it possible to provide the driver not with an uncomfortable feeling, but with an appropriate deceleration feeling. For example, if the vehicle speed is low, the vehicle is not be excessively decelerated.

According to the present embodiment, while the vehicle is freewheeling or while the brake is applied by depressing the pedal, or while the acceleration pedals 44 and 46 are not operated during traveling, and when the steering operating element 42 instructs the vehicle to turn, the controller 40 controls the brake forces of the wheels 14 and 16 so that the brake force of the wheel at the inside of a turn, among the left and the right wheels 14 and 16, can be made greater than the brake force of the wheel at the outside of a turn. For this reason, while the vehicle is freewheeling, the rotating speed of the wheel at the inside of a turn becomes slower than the rotating speed of the wheel at the outside of a turn, enabling the lawnmower vehicle 10 to be turned even while the vehicle is freewheeling, which results in effective safe traveling of the vehicle 10. This prevents the occurrence of a situation where the vehicle is not turned despite that the steering operating element 42 is operated while the vehicle is freewheeling, mitigating a driver's uncomfortable feeling. When the vehicle is turned using the regenerative brake force, even if the driver operates only the steering operating element 42 with getting off the lawnmower vehicle 10 with the lawnmower vehicle 10 stopped, the lawnmower vehicle 10 does not start, effectively assuring safety. Moreover, such an advantage obtained from the controller 40 mainly makes it easy to reduce the cost.

While the vehicle is freewheeling or while the brake is applied by depressing the pedal, that is, while the acceleration pedals 44 and 46 are not operated during traveling and turn instructions are inputted from the steering operating element 42, the controller 40 performs control so that the sum of the brake forces of the left and the right wheels 14 and 16 obtained the vehicle to turn can be not less than a moving-straight regenerative brake force obtained from the left and the right electric motors 26 and 28 while the vehicle is freewheeling and when the steering operating element 42 instructs the vehicle to linearly move. When the controller 40 controls the brake force of the wheels 14 and 16, the controller 40 prevents the brake force from being smaller than the brake force in moving-straight while the vehicle is freewheeling and when the steering operating element 42 instructs the vehicle to turn, which can perform safe traveling of the vehicle 10 more effectively.

Second Embodiment

Figure 10:
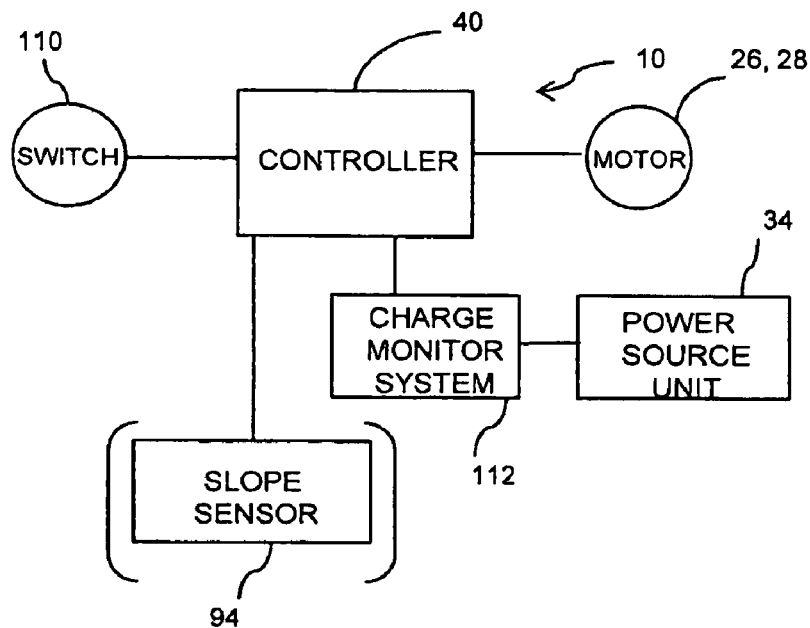
FIG. 10 is a block diagram illustrating a basic configuration of part of the lawnmower vehicle, being an electric ground working vehicle according to a second embodiment of the present invention.

FIG. 10 is a block diagram illustrating a basic configuration of part of the lawnmower vehicle 10, being an electric ground working vehicle according to a second embodiment of the present invention. In the present embodiment, the lawnmower vehicle 10 includes an initial brake force setting switch 110 which is an initial brake force setting operation unit. The initial brake force setting switch 110 is provided in a position at the periphery of the seat 24 (refer to FIG. 1) where the driver can operate the switch 110 and has an analog or a digital display unit or operating unit. If the initial brake force setting switch 110 is operated, the switch 110 can cause the display unit to display an initial brake force setting. While the driver recognizes the setting value with a dial, the driver can input any initial brake force setting to the controller 40 as a signal. The initial brake force includes the regenerative brake force obtained from the left and the right axle-side electric motors 26 and 28 while the vehicle is freewheeling or while the acceleration pedals 44 and 46 are not operated during moving-straight, and initial brake force of the left and the right wheels 14 and 16 are the same force. Thus, the initial brake force setting switch 110 is provided to set any initial brake force setting at the time of freewheel or the like.

A detection signal is inputted to the controller 40 from a charge monitor system 112 capable of detecting the charge amount of the power source unit 34. The controller 40 includes a first calculating unit which calculates the chargeable leeway of the power source unit 34 from the detected value of the charged amount and a setting unit. The setting unit sets a regenerative brake force of an initial state of the axle-side electric motors 26 and 28, that is, a regenerative brake force during a moving-straight, being an initial brake force at the time of freewheeling or pedal braking during a moving-straight or an initial value of the regenerative brake force according to the initial brake force setting value represented by the signal from the initial brake force setting switch 110. The controller 40 controls the regenerative brake force generated by the axle-side electric motors 26 and 28 so that the initial brake force is generated by the left and the right wheels 14 and 16 (refer to FIG. 1) according to the initial brake force setting value set by the setting unit.

In the present embodiment, the controller 40 calculates the maximum generable regenerative brake force equal in magnitude between the left and the right wheels 14 and 16 (refer to FIG. 1) according to the chargeable leeway of the power source unit 34 using the detection value from the charge monitor system 112. The controller 40 calculates target brake forces for both the left and the right wheels 14 and 16 from the initial brake force setting value calculated according to the signal from the initial brake force setting switch 110 and the steering direction and the steering amount of the steering operating element 42 (refer to FIG. 1). For example, when the vehicle turns to the right, the right wheel 16 is greater in the target brake force than the left wheel 14. When the vehicle turns to the left, the left wheel 14 is greater in the target brake force than the right wheel 16. If the target brake force of at least one of the left and the right wheels 14 and 16 is greater than the maximum generable regenerative brake force of at least one of the left and the right wheels 14 and 16, the controller 40 controls the left and the right friction brakes 90 and 92 provided in correspondence with the left and the right wheels 14 and 16 through the brake controller 64 so that the shortage uncompensated by the maximum regenerative brake force of the target brake force or the maximum regenerative brake can be compensated by the friction brake force generated by the friction brakes 90 and 92 (refer to FIG. 3). The driver operates the initial brake force setting switch 110 to enable suppression of an excessive reduction in chargeable amount of the power source unit 34. The vehicle can be stably braked while freewheeling and the vehicle speed can be stably reduced irrespective of shortage in chargeable amount of the power source unit 34.

In the present embodiment, as is the case with the first embodiment, a slope sensor 94 is provided which detects an angle tilted with respect to the horizontal plane and the front and the back direction of the lawnmower vehicle 10. The detected signal of the slope sensor 94 may be inputted to the controller 40. In this case, the controller 40 may include an adjustment device for adjusting the regenerative brake force generated by the axle-side electric motors 26 and 28 according to the angle tilted with respect to the horizontal plane obtained from the slope sensor 94. For example, if the controller 40 determines from the detected angle tilted with respect to the horizontal plane that the lawnmower vehicle 10 is descending a slope, the regenerative brake force may be adjusted so as to increase proportionally to the tilted angle. On the other hand, if the controller 40 determines that the lawnmower vehicle 10 is ascending a slope, the regenerative brake force may be adjusted so as to decrease proportionally to the tilted angle. According to the configuration, the regenerative brake force can be automatically adjusted according to the tilted angle of the road surface. Incidentally, the controller 40 can estimate an angle tilted with respect to the horizontal plane which is the same as that obtained from the slope sensor 94 from a relationship between an estimation of torque obtained from the rotating speed of the axle-side electric motors 26 and 28 inputted to the controller 40, detected current of the axle-side electric motors 26 and 28, and detected value of a vehicle speed sensor or detected amount of depression of the acceleration pedals 44 and 46. In this case, the slope sensor 94 may be omitted. For example, if a torque estimation is high but the vehicle speed is low, or if the amount of depression of the acceleration pedals 44 and 46 is greater than the amount of depression corresponding to a torque estimation, the controller 40 can estimate the vehicle ascending a slope and its tilted angle.

If there is provided an adjustment unit for adjusting the regenerative brake force generated by the axle-side electric motors 26 and 28 according to the angle tilted with respect to the horizontal plane obtained from the slope sensor 94, the value adjusted by the adjustment unit is prioritized over the value set by the initial brake force setting switch 110. For example, if the brake force corresponding to the value set by the initial brake force setting switch 110 at the time of descending is smaller than the regenerative brake force adjusted by the adjustment unit, the controller 40 may control the wheels 14 and 16 (refer to FIGS. 1 and 2) using the regenerative brake force set by the adjustment unit. Only if the value set by the initial brake force setting switch 110 is smaller than the value adjusted by the adjustment unit, the controller 40 may control the wheels 14 and 16 according to the adjustment value. In this case, since the larger brake force is applied to the wheels 14 and 16, safe traveling can be effectively performed. Other configurations and operations in the present embodiment are the same as those in the first embodiment, so duplicated illustration and description are omitted.

In the present embodiment, if the target brake force of at least one of the left and the right wheels 14 and 16 is greater than the maximum generable regenerative brake force of at least one of the left and the right wheels 14 and 16, the controller 40 may not control the left and the right friction brakes 90 and 92 so that the shortage uncompensated by the maximum regenerative brake force of the target brake force or the maximum regenerative brake can be compensated by the friction brake force generated by the friction brakes 90 and 92

(refer to FIG. 3). In this case, for example, if the target brake force of at least one of the left and the right wheels 14 and 16 is greater than the maximum generable regenerative brake force of at least one of the left and the right wheels 14 and 16, the controller 40 controls so that the left and the right wheels 14 and 16 can generate the target brake force. For this purpose, the controller 40 controls the right and the left-axle-motor driver circuits 86 and 88 (refer to FIG. 3), being the regenerative brake driving units, so that at least one of the left and the right axle-side electric motors 26 and 28 generates a reverse torque to cause the power source unit 34 to supply a driving electric power to at least one of the left and the right axle-side electric motors 26 and 28. For example, if there is a configuration wherein the left and the right axle-side electric motors 26 and 28 are driven such that a rotating magnetic field rotating in the positive direction is generated on a stator of a DC brushless motor, a three-phase AC induction motor or the like to rotate a rotor opposing the stator, the controller 40 controls the driver circuits 86 and 88 to rotate the rotating magnetic field on the stator side in the opposite direction so that the left and the right electric motors 26 and 28 can generate the target brake force. As a result, the left and the right electric motors 26 and 28 can be caused to generate a reverse torque. If required, the controller 40 may control the rotor so that the rotor is not actually rotated in the opposite direction.

A selection switch which can be operated by the driver may be provided at the periphery of the seat 24 (refer to FIG. 1) and the controller 40 may control the selection switch so that the selection switch can select between compensating the shortage uncompensated by the maximum regenerative brake force of the target brake force or the maximum regenerative brake with the friction brake force generated by the friction brakes 90 and 92 (refer to FIG. 3) and causing at least one of the left and the right electric motors 26 and 28 to generate a reverse torque so that the left and the right electric motors 26 and 28 can generate the target brake force.

A boosting DC/DC converter may be provided between the driver circuits 86 and 88 (refer to FIG. 3) and the power source unit 34. The output voltage of the power source unit 34 may be boosted to be inputted to the driver circuits 86 and 88. The boosting ratio may be varied according to need. The output voltage between the positive and the negative electrode lines of the driver circuits 86 and 88 may be lowered to be inputted to the power source unit 34.

Third Embodiment

Figure 11A:
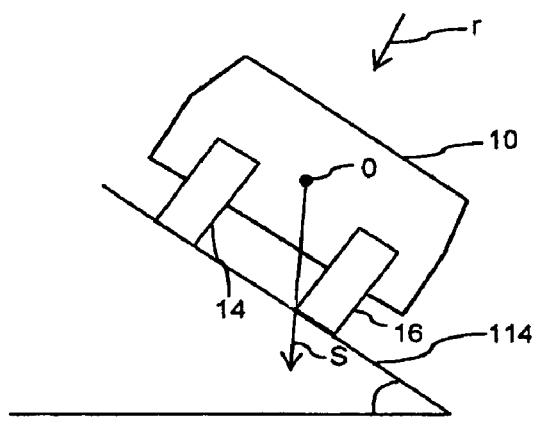
FIG. 11A is a schematic diagram showing a lawnmower vehicle, being an electric ground working vehicle according to a third embodiment of the present invention, traveling while rolling, viewed from the rear side of the vehicle.
Figure 11B:
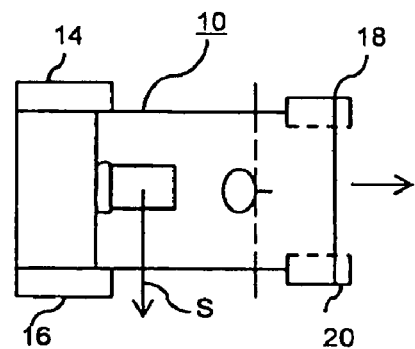
FIG. 11B is a schematic diagram showing a lawnmower vehicle, being an electric ground working vehicle according to a third embodiment of the present invention, travelling while rolling, viewed from the direction indicated by an arrow "r" illustrated in FIG. 11A.
Figure 12:
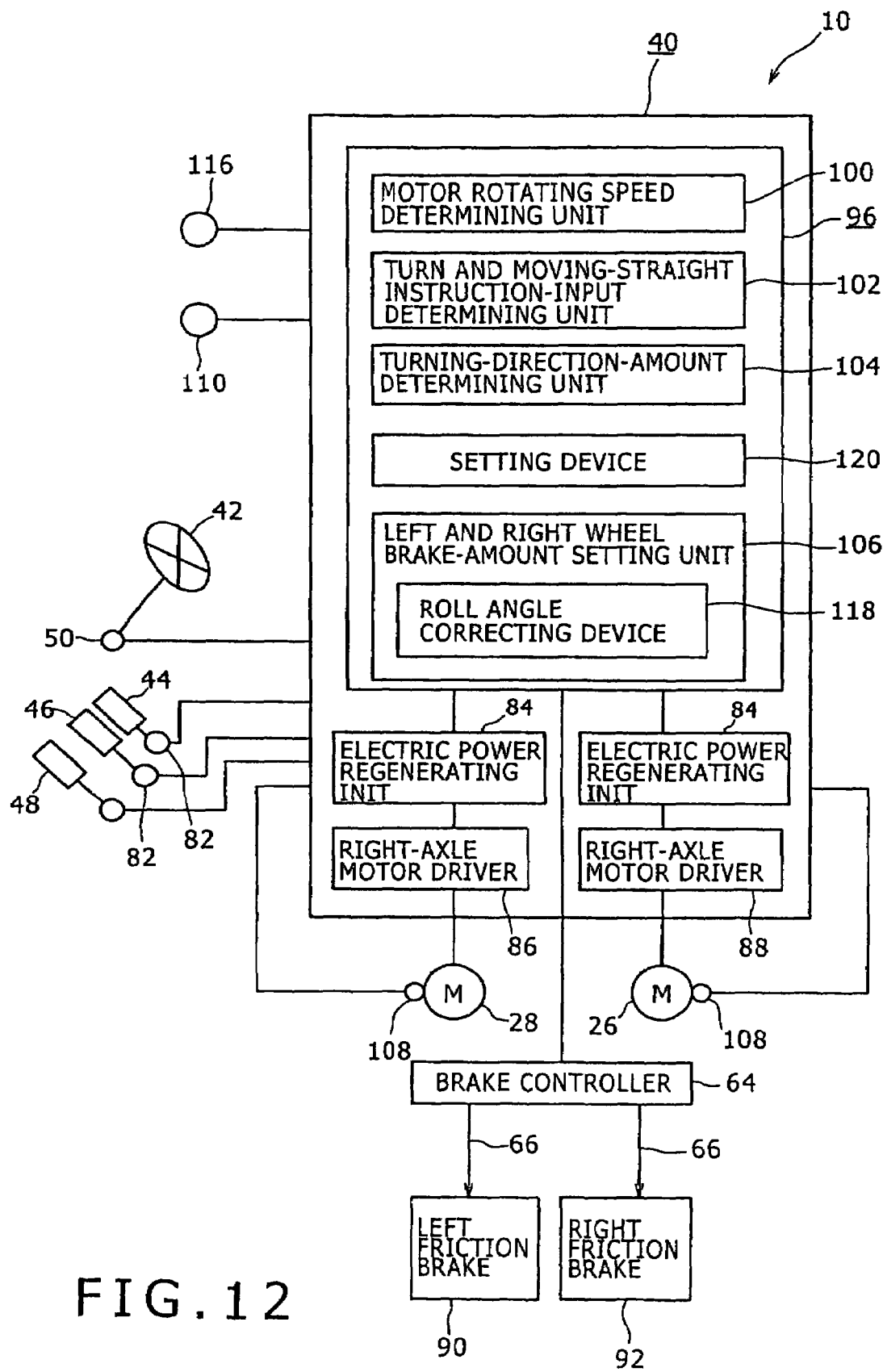
FIG. 12 is a block diagram illustrating a basic configuration of a lawnmower vehicle including a controller according to the third embodiment.
Figure 13:
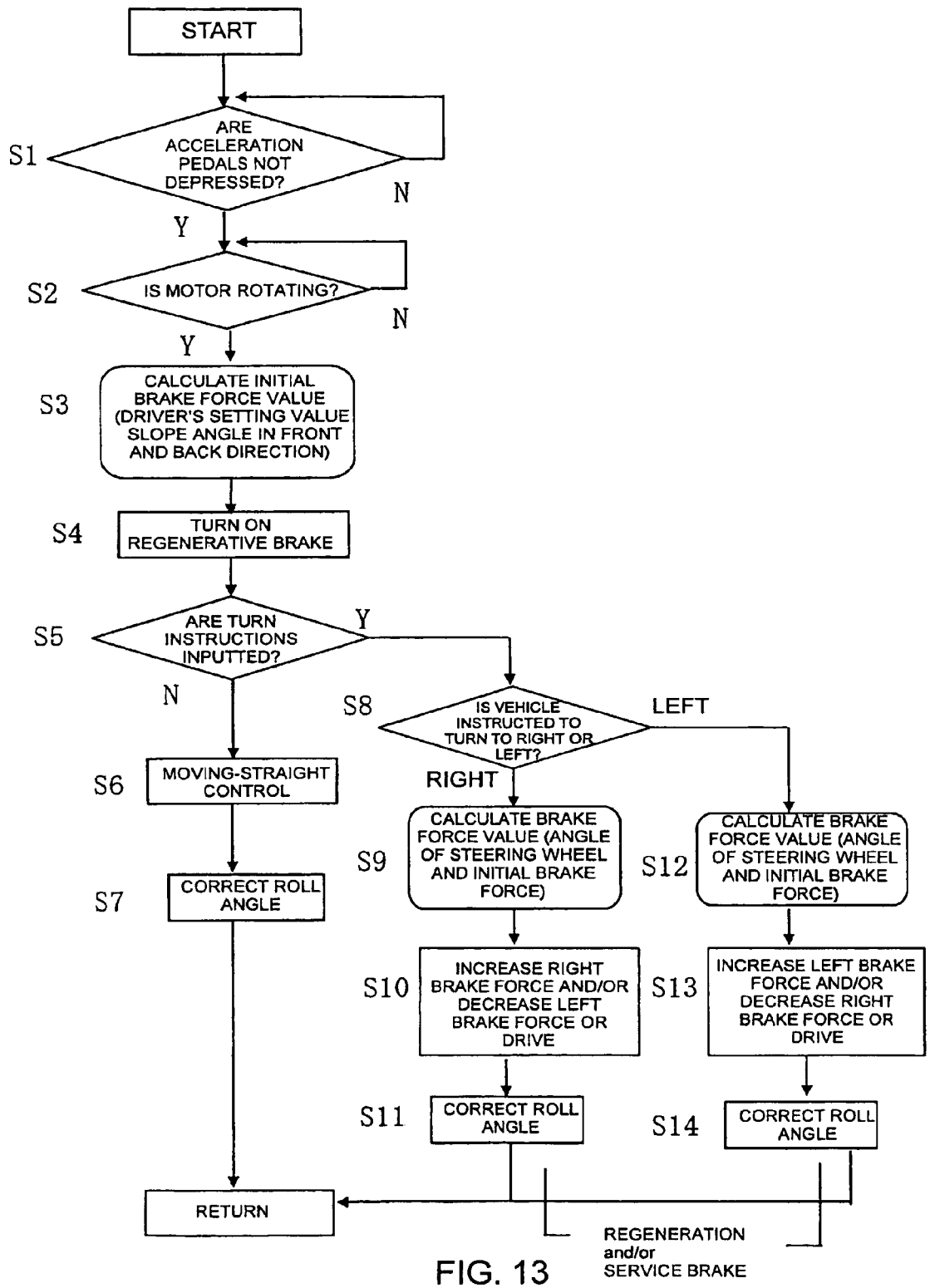
FIG. 13 is a flow chart illustrating steps for turn brake control in the third embodiment.

FIG. 11A is a schematic diagram showing a lawnmower vehicle, being an electric ground working vehicle according to a third embodiment of the present invention, traveling while rolling, viewed from the rear side of the vehicle. FIG. 11B is a schematic diagram viewed from the direction indicated by an arrow "r" illustrated in FIG. 11A. FIG. 12 is a block diagram illustrating a basic configuration of a lawnmower vehicle including a controller according to the present embodiment. FIG. 13 is a flow chart illustrating steps for turn brake control in the present embodiment.

When the lawnmower vehicle 10 travels on a slope 114 while rolling, that is to say, while the vehicle is rolling and tilts to one side, namely to the left or the right with an axis which extends in the front and the rear direction of the vehicle and passes the center of gravity O as a center, gravity acts in the direction indicated by an arrow S illustrated in FIGS. 11A and 11B. For this reason, the grounding force of the wheel 16 among the left and the right wheels 14 and 16 to the slope 114, being the wheel on the lower side of the slope, is increased, so that a force acts which tends to turn to the direction toward the lower side of the vehicle 10. In the present embodiment, even in this case, the present invention has been made so that the lawnmower vehicle 10 can advance in the direction the driver intends. That is to say, in the present embodiment, as illustrated in FIG. 12, the lawnmower vehicle 10 according to the first embodiment illustrated in FIGS. 1 to 9 includes a roll angle sensor 116, being a roll angle detecting unit, and a left and right wheel brake-amount setting unit 106 of the controller 40 includes a roll angle correcting unit 118. As is the case with the second embodiment illustrated in FIG. 10, the lawnmower vehicle 10 includes an initial brake force setting switch 110 and the controller 40 includes a setting unit 120 for setting an initial brake force corresponding to a signal from the initial brake force setting switch 110.

The roll angle sensor 116 detects a roll angle θ (refer to FIGS. 11A and 11B) of the lawnmower vehicle 10 with respect to the horizontal plane and inputs the detected signal to the controller 40. The roll angle sensor 116 is capable of detecting, for example, the roll angle θ which is an angle at which a virtual plane, including two positions located at the same positions of the vehicle with respect to the upper and the lower direction apart in the left and the right of the vehicle, is tilted with respect to the horizontal plane. It is made possible to detect whether the lawnmower vehicle 10 travels while rolling, and to detect the tilted angle of the slope 114 (refer to FIGS. 11A and 11B) or the roll angle θ from the signal of the roll angle sensor 116. While the vehicle is freewheeling or while the brake is applied by depressing the pedal, that is, while the acceleration pedals 44 and 46 are not operated while traveling and when the roll angle θ represented by the signal from the roll angle sensor 116 is not zero, the roll angle correcting unit 118 has a function to correct the brake forces of the left and the right wheels 14 and 16 (refer to FIGS. 11A and 11B) according to the roll angle θ so that the vehicle 10 can turn in the direction corresponding to the steering direction of the steering operating element 42 when traveling on flat land at a roll angle θ of zero. Data representing a map of the relationship between a roll angle θ, the correction amount corresponding to the roll angle θ, and a steering angle may be stored in the storage unit of the controller 40, and the roll angle correcting unit 118 can appropriately read data stored in the storage unit. The correction amount corresponding to the roll angle θ can be made different according to vehicle speed.

Referring to the flow chart in FIG. 13, there are described steps for performing freewheeling brake control according to the present embodiment. In the following, a description is given using the reference numerals illustrated in FIGS. 11A, 11B, and FIG. 12. When the lawnmower vehicle 10 starts and then the freewheeling brake control program starts, an acceleration depression determining unit (not shown) determines whether the acceleration pedals 44 and 46 are not operated, i.e., whether the acceleration pedals 44 and 46 are not depressed (step S1). If the acceleration depression determining unit determines that the acceleration pedals 44 and 46 are not operated, the motor rotating speed determining unit 100 determines whether the electric motors 26 and 28 are rotating from the signals inputted from the motor sensors 108 (step S2). If the electric motors 26 and 28 are rotating, it is determined that the vehicle is freewheeling or the brake is applied by depressing the pedal. The setting unit 120 sets the initial brake force, that is, the setting unit 120 calculates the initial brake force (S3). In this case, the value that the driver sets using the initial brake force setting switch 110 may be taken as the initial brake force, or the initial brake force may be automatically set according to the value of an angle tilted in the front and back direction detected by the slope sensor 94

(refer to FIG. 10). The initial brake force corresponding to the tilt angle or the initial brake force corresponding to the value set by the initial brake force setting switch 110, whichever is greater, may be taken as the target initial brake force.

As is the case with the first embodiment, the integrated control unit 96 outputs an instruction signal to the electric power regenerating unit 84, performing an initial regenerative brake by the set initial brake force value, that is, turning on a regenerative brake (step S4). In this case, the left and the right axle-side electric motors 26 and 28 apply the same regenerative brake force to the left and the right wheels 14 and 16.

The turn and moving-straight instruction-input determining unit 102 determines whether the turn instructions are inputted (step S5). If the turn and moving-straight instruction-input determining unit 102 determines that the turn instructions are not inputted, i.e., that the moving-straight instructions are inputted, in step S6, a moving-straight control is performed. If it is determined that the roll angle θ is not zero, the roll angle correcting unit 118 sets the brake forces so that the brake force provided for the wheel 14 (or 16) on the upper side of the slope 114 can be made greater than the brake force provided for the wheel 16 (or 14) on the lower side of the slope 114 according to the roll angle θ so that the vehicle 10 can linearly move. The controller 40 controls the brake forces of the left and the right wheels 14 and 16 according to the set value.

On the other hand, if it is determined that the turn instructions are inputted in step S5, the turning-direction-amount determining unit 104 determines a steering direction of the steering operating element 42 (step S8). For example, if it is determined that the steering operating element 42 is steered to the right, the left and right wheel brake-amount setting unit 106 sets the target brake forces of the left and the right wheels 14 and 16 according to the steering direction and the steering angle in step S9. In this case, the left and right wheel brake-amount setting unit 106 performs setting so that the target brake force of the right wheel 16 can be made greater than the target brake force of the left wheel 14 (step S10), and the roll angle correcting unit 118 corrects the set value according to the roll angle θ in step S11. For example, the roll angle correcting unit 118 makes the target brake force corresponding to the brake force applied to the wheel 16 (or 14) on the lower side of the slope smaller than the target brake force set before the roll angle is corrected, and makes the target brake force corresponding to the brake force applied to the wheel 14 (or 16) on the upper side of the slope greater than the target brake force set before the roll angle is corrected. The controller 40 applies the brake force meeting the target brake force to the left and the right wheels 14 and 16 to turn the lawnmower vehicle 10 to the right, and the process returns to step S1. In this case, the brake force is applied to the left and the right wheels 14 and 16 by the regenerative brake only, the regenerative brake and the friction brake, or the reverse torque generated by the left and the right electric motors 26 and 28. For example, as is the case with the second embodiment described in FIG. 10, there may be configured a device for compensating the shortage uncompensated by the maximum regenerative brake force of the target brake force or the maximum regenerative brake by the friction brake force generated by the friction brakes 90 and 92 (refer to FIG. 3), or a device for controlling the driver circuits 86 and 88 so that at least one of the left and the right electric motors 26 and 28 generates a reverse torque to enable the left and the right electric motors 26 and 28 to generate the target brake force and the charge monitor system 112.

On the other hand, if it is determined that the steering operating element 42 is steered to the left in step S8, the left and right wheel brake-amount setting unit 106 sets the target brake forces of the left and the right wheels 14 and 16 according to the steering direction and the steering angle in step S12. In this case, the left and right wheel brake-amount setting unit 106 performs setting so that the target brake force of the left wheel 14 can be made greater than the target brake force of the left wheel 16 (step S13), and the roll angle correcting unit 118 corrects the set value according to the roll angle θ in step S14. For example, the roll angle correcting unit 118 makes the target brake force corresponding to the brake force applied to the wheel 16 (or 14) on the lower side of the slope smaller than the target brake force set before the roll angle is corrected, and makes the target brake force corresponding to the brake force applied to the wheel 14 (or 16) on the upper side of the slope greater than the target brake force set before the roll angle is corrected. The controller 40 applies the brake force meeting the target brake force to the left and the right wheels 14 and 16 to turn the lawnmower vehicle 10 to the left, and the process returns to step S1. In this case also, the brake force is applied to the left and the right wheels 14 and 16 by the regenerative brake only, the regenerative brake and the friction brake, or the reverse torque generated by the left and the right electric motors 26 and 28.

According to the present embodiment, the driver can easily drive the lawnmower vehicle 10 in the direction the driver wants to advance in while the lawnmower vehicle 10 is traveling on the slope 114 while rolling, and even while the vehicle is freewheeling or while the brake is applied by depressing the pedal, that is, while the acceleration pedals 44 and 46 are not operated, thereby enabling more effective performing of safe traveling of the lawnmower vehicle 10. Other configurations and operations of the present embodiment are the same as those in the above embodiments, and the equivalent portions are given the same reference numerals to omit duplicated illustration and description. For example, the lawnmower vehicle may be configured by the controller and the charge monitor system illustrated in FIG. 10 and the right friction brake unit and the left friction brake illustrated in FIG. 3.

In the present embodiment, the roll angle may be corrected in steps preceding step S5 in stead of in steps S7, S11 and S14 in FIG. 13.

In the present embodiments, although the example is described where the acceleration pedals 44 and 46 are used as an acceleration operating element, an acceleration lever or an acceleration steering wheel with which acceleration instructions can be inputted by rotating by hand or grabbing with fingers may be used as an acceleration operating element.

In the present embodiments, although the example is described where the acceleration pedals 44 and 46 being an acceleration operating element and the steering operating element 42 being a turn operating element are members that are different from each other, the acceleration and the steering operating element may be formed of a joystick being a single common operating element in the present embodiments. FIG. 14A is a schematic diagram illustrating a joystick of a first example. FIG. 14B is a top view of the joystick in FIG. 14A. As illustrated in FIGS. 14A and 14B, a joystick 122 may be provided on the lawnmower vehicle 10 (refer to FIG. 1 and others). The joystick 122 of the first example standing upright provides acceleration instructions of zero, which means that turn instructions are not issued from the turn operating element, that is, moving-straight instructions are inputted. Pushing the joystick 122 forward inputs instructions for forward acceleration and pulling the joystick 122 backward inputs instructions for backward acceleration. Pushing the joystick 122 to the left or the right with the joystick 122 kept in an upright position or with the joystick 122 pushed forward or backward inputs instructions for turning to either the left or the right. When the joystick 122 of the first example is used, the joystick 122 is sometimes pushed to the left or to the right from the upright position when traveling, which corresponds to the case where the acceleration operating element is not operated, that is, the case where the vehicle freewheels or the brake is applied by the pedal, corresponding to the case where the vehicle is turned. According to the above embodiments, it is made possible to effectively perform safe traveling of the lawnmower vehicle 10 even when the joystick 122 is used, the acceleration operating element is not operated during traveling, or the vehicle freewheels.

FIG. 15 is a schematic diagram illustrating a joystick of a second example. A joystick 122*a* of the second example is rotatable clockwise or counterclockwise around a lever axis 124, and can be pushed forward or backward only from its upright position. Pushing the joystick 122*a* forward or backward inputs instructions for forward or backward acceleration. Rotating the joystick 122*a* clockwise inputs instructions for turning to the right and rotating the joystick 122*a* counterclockwise inputs instructions for turning to the left. When the joystick 122*a* of the second example is used, the joystick 122*a* is sometimes rotated clockwise or counterclockwise with the joystick 122*a* kept in an upright position when traveling, which corresponds to the case where the acceleration operating element is not operated, that is, the case where the vehicle freewheels or the brake is applied by the pedal, corresponding to the case where the vehicle is turned. According to the above embodiments, it is made possible to effectively perform safe traveling of the lawnmower vehicle 10 (refer to FIG. 10 and others) even when the joystick 122*a* is used, the acceleration operating element is not operated when traveling, or the vehicle freewheels. The joysticks 122 and 122*a* of the first and the second example are moved to other directions or pushed forward or backward and rotated around the axis 124 to enable separate functioning as an acceleration operating element and a turn operating element.

Fourth Embodiment

A fourth embodiment of the present invention is described below with reference to FIGS. 1 to 9. In the first embodiment illustrated in FIGS. 1 to 9, the lawnmower vehicle 10 can be configured to include the motor sensor 108 (refer to FIG. 4), being a detecting unit and a rotating speed sensor for detecting the rotating speed of the left and the right wheels 14 and 16, and the controller 40, being a control unit capable of controlling the rotating speed and the brake force of the left and the right wheels 14 and 16. In this case, the controller 40 controls the brake force of the wheel 14 (or 16) at the outside of a turn, among the left and the right wheels 14 and 16, so that the brake force becomes zero or constant when the acceleration pedals 44 and 46 (refer to FIG. 1), being an acceleration operating element, are not operated when traveling and turn instructions are inputted from the steering operating element 42 (refer to FIG. 1), being a turn operating element. In this case, however, if the brake force is applied to the wheel 14 (or 16) at the outside of a turn at the time of depressing the brake pedal 48 during moving-straight immediately before turning, the controller 40 controls the brake force applied to the wheel 14 (or 16) so as to be kept constant, as it is also at the time of turning. On the other hand, if the brake pedal 48 is not depressed during a moving-straight immediately before turning and the brake force is not applied to the wheel 14 (or 16) at the outside of a turn, the controller 40 controls the brake force applied to the wheel 14 (or 16) to be kept at zero also when turning. In addition to that, the controller 40 calculates a setting inside wheel rotating speed Vi' being lower than an outside wheel rotating speed Vo from the outside wheel rotating speed Vo of the wheel 14 (or 16) at the outside of a turn detected from the motor sensor 108, and the turn instruction value from the steering operating element 42, to control the wheel 16 (or 14) so that an inside wheel rotating speed Vi of the wheel 16 (or 14) at the inside of a turn, among the left and the right wheels 14 and 16, becomes equal to Vi'. In this case, for example, the setting inside wheel rotating speed Vi' is set by a predetermined calculation method so that a difference or a ratio between the setting inside wheel rotating speed Vi' and the outside wheel rotating speed Vo increases as a rotating angle from the neutral position of the steering operating element 42 increases.

As is the case with the above embodiments, also in such a configuration, the rotating speed of the wheel at the inside of a turn becomes lower than the rotating speed of the wheel at the outside of a turn while the vehicle is freewheeling. The lawnmower vehicle 10 can be turned even while the vehicle is freewheeling, enabling more effective performing of safe traveling of the lawnmower vehicle 10. In addition, while the vehicle is freewheeling and turn instructions are inputted from the steering operating element 42, the brake force in the above case can be prevented from becoming smaller than the brake force during a moving-straight, enabling more effective performing of safe traveling of the lawnmower vehicle 10.

As the rotating speed sensor, being a detecting unit for detecting the rotating speeds of the left and the right wheels 14 and 16, there may be used a wheel speed sensor for directly detecting the rotating speed of the wheels, and not through the electric motors 26 and 28, instead of the motor sensor 108. For example, a unit to be detected such as an encoder is provided on a portion rotating in synchronization with the wheels 14 and 16 and a sensor opposing the unit to be detected may be provided on the vehicle body.

Fifth Embodiment

A fifth embodiment of the present invention is described below with reference to FIGS. 1 to 9. As is the case with the fourth embodiment, in the first embodiment illustrated in FIGS. 1 to 9, the lawnmower vehicle 10 can be configured to include the motor sensor 108 (refer to FIG. 4) or a wheel speed sensor (not shown), being a detecting unit for detecting the rotating speed of the left and the right wheels 14 and 16, and the controller 40 being a control unit capable of controlling the rotating speed and the brake force of the left and the right wheels 14 and 16. In this case, unlike the fourth embodiment, the controller 40 controls the wheel 14 (or 16) at the inside of a turn, among the left and the right wheels 14 and 16, so that the brake force becomes zero or constant when the acceleration pedals 44 and 46 (refer to FIG. 1), being an acceleration operating element when traveling, are not operated and turn instructions are inputted from the steering operating element 42 (refer to FIG. 1), being a turn operating element. In this case, if the brake force is applied to the wheel 14 (or 16) at the inside of a turn at the time of depressing the brake pedal 48 during a moving-straight immediately before turning, the controller 40 controls the brake force applied to the wheel 14 (or 16) so as to be kept constant, as it is also at the time of turning. On the other hand, if the brake pedal 48 is not depressed during a moving-straight immediately before turning and the brake force is not applied to the wheel 14 (or 16) at the inside of a turn, the controller 40 controls the brake force applied to the wheel 14 (or 16) to be kept at zero also when turning. In addition to that, the controller 40 calculates a setting outside wheel rotating speed Vo' being higher than an inside wheel rotating speed Vi from the inside wheel rotating speed Vi of the wheel 14 (or 16) at the inside of a turn detected from the motor sensor 108, or the wheel speed sensor, and the turn instruction value from the steering operating element 42 to control the wheel 14 (or 16) so that an outside wheel rotating speed Vo of the wheel 16 (or 14) at the outside of a turn, among the left and the right wheels 14 and 16, becomes equal to Vo'. In this case also, for example, the setting outside wheel rotating speed Vo' is set by a predetermined calculation method so that a difference or a ratio between the setting outside wheel rotating speed Vo' and the inside wheel rotating speed Vi increases as a rotating angle from the neutral position of the steering operating element 42 increases.

Also in this configuration, as is the case with the above embodiments, the rotating speed of the wheel at the inside of a turn becomes lower than the rotating speed of the wheel at the outside of a turn while the vehicle is freewheeling or the like to enable the lawnmower vehicle 10 to be turned even while the vehicle is freewheeling or the like, thereby enabling more effective performing of safe traveling of the lawnmower vehicle 10. In this case, although the speed in turning may become higher than the speed in a moving-straight because the brake force is not applied to the wheel at the inside of a turn, in that case, travel distance during freewheel can be increased.

What is claimed is:

1. An electric ground working vehicle comprising:
   a left wheel and a right wheel, being main driving wheels, which are independently driven by a left electric motor and a right electric motor respectively;
   at least one caster, being a steering control wheel, which is freely steerable;
   a working apparatus driven for ground working;
   an acceleration operating element for performing acceleration instructions;
   a turn operating element for performing turn instructions; and
   a control unit;
   wherein the control unit controls force applied to the wheels, being the brake force or driving force of the wheels, so that the rotating speed of a wheel at the inside of a turn, of the left wheel and the right wheel, can be made lower than the rotating speed of the wheel at the outside of a turn, when the acceleration operating element is not operated during traveling, and turn instructions are inputted from the turn operating element;
   wherein the control unit controls a brake driving unit so that electric power is sent from the left electric motor and the right electric motor to an electrical load when the acceleration operating element is not operated during traveling to brake the left wheel and the right wheel by the sending of the electric power to the load, and controls the brake force of the wheels so that the brake force of the wheel at the inside of a turn, of the left wheel and the right wheel, can be greater than the brake force of the wheel at the outside of a turn when the acceleration operating element is not operated during traveling and turn instructions are inputted from the turn operating element.

2. The electric ground working vehicle according to claim 1, wherein the control unit controls the brake driving unit corresponding to at least one of the left electric motor and the right electric motor so that a turn-inside regenerative brake force which is a turn-inside brake force by the sending of the electric power to the load and obtained from the electric motor corresponding to the wheel at the inside of a turn, of the left wheel and the right wheel, can be made greater than a turn-outside regenerative brake force which is a turn-outside brake force by the sending of the electric power to the load and obtained from the electric motor corresponding to the wheel at the outside of a turn when the acceleration operating element is not operated during traveling and turn instructions are inputted from the turn operating element.

3. The electric ground working vehicle according to claim 1, further comprising:
   a left friction brake unit and a right friction brake unit which are provided in correspondence with the left wheel and the right wheel, and whose brake forces can be independently controlled;
   wherein the control unit controls the friction brake units so that a turn-inside friction brake force obtained from the friction brake unit corresponding to the wheel at the inside of a turn, of the left wheel and the right wheel, can be greater than a turn-outside friction brake force obtained from the friction brake unit corresponding to the wheel at the outside of a turn when the acceleration operating element is not operated during traveling and turn instructions are inputted from the turn operating element.

4. The electric ground working vehicle according to claim 1, wherein
   the control unit controls the brake force of the wheel so that the sum of the brake forces of the left wheel and the right wheel obtained when the acceleration operating element is not operated during traveling and turn instructions are inputted from the turn operating element can be made greater than a moving-straight regenerative brake force which is a moving-straight brake force by the sending of the electric power to the load and obtained from the left electric motor and the right electric motor when the acceleration operating element is not operated during traveling and moving-straight instructions are inputted from the turn operating element.

5. The electric ground working vehicle according to claim 1, further comprising:
   an initial brake force setting operation unit for discretionally setting the same initial brake forces in the left wheel and the right wheel, including the regenerative brake forces which are brake forces by the sending of the electric power to the load and obtained from the left electric motor and the right electric motor when the acceleration operating element is not operated during traveling straight.

6. The electric ground working vehicle according claim 5, wherein if a target brake force of at least one of the left wheel and the right wheel calculated from an initial brake force setting value calculated in response to a signal from the initial brake force setting operation unit, and the steering direction and the steering amount of the turn operating element, is greater than the maximum regenerative brake force that can be generated on at least one of the left wheel and the right wheel according to the chargeable leeway of the electric power source unit, the left friction brake unit and the right friction brake unit provided in correspondence with the left wheel and the right wheel are controlled so that a shortage uncompensated by the maximum regenerative brake force of the target brake force can be compensated by the friction brake force.

7. The electric ground working vehicle according claim 5, wherein if a target brake force of at least one of the left wheel and the right wheel calculated from an initial brake force setting value calculated in response to a signal from the initial brake force setting operation unit, and the steering direction and the steering amount of the turn operating element, is greater than the maximum regenerative brake force that can be generated on at least one of the left wheel and the right wheel according to the chargeable leeway of the electric power source unit, a driver circuit, being the regenerative brake driving unit, is controlled so that at least one of the left electric motor and the right electric motor can generate a reverse torque to cause the electric power source unit to supply a driving electric power to at least one of the left electric motor and the right electric motor, thereby generating the target brake force on the left wheel and the right wheel.

8. The electric ground working vehicle according to claim 1, further comprising: roll angle detecting unit for detecting a roll angle of the vehicle and inputting the detected signal to the control unit; wherein the control unit includes the roll angle correcting unit for correcting the brake forces of the left wheel and the right wheel according to the roll angle so that the vehicle can be turned in the direction corresponding to the direction steered by the turn operating element when the acceleration operating element is not operated during traveling and the roll angle represented by a signal from the roll angle detecting unit is not zero.

9. The electric ground working vehicle according to claim 1, wherein the acceleration operating element is an acceleration pedal and the turn operating element is a steering wheel.

10. The electric ground working vehicle according to claim 1, wherein the acceleration operating element and the turn operating element are formed by a single common operating element, and the common operating element is moved in other directions, or pushed forward or backward and rotated around an axis, to enable separate functioning as an acceleration operating element and a turn operating element.

* * * * *